United States Patent
Diessner

(10) Patent No.: US 11,305,691 B2
(45) Date of Patent: Apr. 19, 2022

(54) VEHICULAR VISION SYSTEM

(71) Applicant: Magna Electronics Inc., Auburn Hills, MI (US)

(72) Inventor: Horst D. Diessner, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 557 days.

(21) Appl. No.: 16/157,215

(22) Filed: Oct. 11, 2018

(65) Prior Publication Data

US 2019/0039518 A1 Feb. 7, 2019

Related U.S. Application Data

(63) Continuation of application No. 14/359,340, filed as application No. PCT/US2012/066570 on Nov. 27, (Continued)

(51) Int. Cl.
*H04N 7/18* (2006.01)
*H04N 5/247* (2006.01)
(Continued)

(52) U.S. Cl.
CPC .............. *B60R 1/00* (2013.01); *G02B 3/14* (2013.01); *G06K 9/00805* (2013.01);
(Continued)

(58) Field of Classification Search
CPC ................ B60R 1/00; B60R 2300/806; B60R 2300/802; B60R 2300/303;
(Continued)

(56) References Cited

U.S. PATENT DOCUMENTS 4,967,319 A 10/1990 Seko
4,970,653 A 11/1990 Kenue
(Continued)

FOREIGN PATENT DOCUMENTS

EP 1115250 A1 7/2001
EP 2377094 A1 10/2011
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Zaihan Jiang
(74) *Attorney, Agent, or Firm* — Honigman LLP

(57) ABSTRACT

A vehicular vision system includes a rearward viewing camera and a control, which includes a processor that processes image data captured by the camera. During a reversing maneuver of the vehicle, the control, via processing of captured image data, detects points of interest of detected objects. Responsive to detection of the points of interest of the detected objects, the control determines if the detected objects have height dimensions and determines that objects having a height dimension greater than a threshold height are objects of interest. During the reversing maneuver of the vehicle, the control determines distances to the determined objects of interest and determines which object of interest is closest to the vehicle. During the reversing maneuver of the vehicle, responsive to the determination of the closest object of interest rearward of the vehicle, the control determines whether the determined closest object of interest is a potential hazard.

20 Claims, 35 Drawing Sheets

Related U.S. Application Data 2012, now Pat. No. 10,099,614, and a continuation-in-part of application No. PCT/US2012/066571, filed on Nov. 27, 2012.

(60) Provisional application No. 61/605,409, filed on Mar. 1, 2012, provisional application No. 61/563,965, filed on Nov. 28, 2011, provisional application No. 61/650,667, filed on May 23, 2012, provisional application No. 61/579,682, filed on Dec. 23, 2011, provisional application No. 61/565,713, filed on Dec. 1, 2011.

(51) Int. Cl.
  *B60R 1/00* (2006.01)
  *G06T 7/246* (2017.01)
  *G06K 9/00* (2006.01)
  *G02B 3/14* (2006.01)

(52) U.S. Cl.
  CPC ............ *G06T 7/246* (2017.01); *H04N 5/247* (2013.01); *H04N 7/18* (2013.01); *B60R 2300/105* (2013.01); *B60R 2300/303* (2013.01); *B60R 2300/802* (2013.01); *B60R 2300/806* (2013.01); *B60R 2300/8066* (2013.01); *B60R 2300/8093* (2013.01); *G06T 2207/10016* (2013.01); *G06T 2207/30252* (2013.01)

(58) Field of Classification Search
  CPC .... B60R 2300/8093; B60R 2300/8066; B60R 2300/105; G06T 7/246; G06T 2207/30252; G06T 2207/10016; H04N 5/247; H04N 7/18; G06K 9/00805; G02B 3/14
  USPC ....................................................... 348/148
  See application file for complete search history.

(56) References Cited

U.S. PATENT DOCUMENTS

| | | |
|---|---|---|
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,177,606 A | 1/1993 | Koshizawa |
| 5,182,502 A | 1/1993 | Slotkowski et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissei et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Feder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,138,062 A * | 10/2000 | Usami ................. B62D 15/026 180/168 |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gulla et al. |
| 6,477,464 B2 | 11/2002 | McCarthy et al. |
| 6,498,620 B2 | 12/2002 | Schofield et al. |
| 6,523,964 B2 | 2/2003 | Schofield et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |

(56) References Cited

U.S. PATENT DOCUMENTS

| | | |
|---|---|---|
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,455 B2 | 11/2003 | Miles |
| 6,672,731 B2 | 1/2004 | Schnell et al. |
| 6,678,056 B2 | 1/2004 | Downs |
| 6,678,614 B2 | 1/2004 | McCarthy et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,744,353 B2 | 6/2004 | Sjonell |
| 6,762,867 B2 | 7/2004 | Lippert et al. |
| 6,795,221 B1 | 9/2004 | Urey |
| 6,802,617 B2 | 10/2004 | Schofield et al. |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,889,161 B2 | 5/2005 | Winner et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,095,786 B1* | 8/2006 | Schonfeld .............. H04N 19/51 375/240.16 |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,336,299 B2 | 2/2008 | Kostrzewski et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,821 B2 | 9/2008 | Bechtel et al. |
| 7,482,916 B2 | 1/2009 | Au et al. |
| 7,526,103 B2 | 4/2009 | Schofield et al. |
| 7,532,109 B2 | 5/2009 | Takahama et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,566,851 B2 | 7/2009 | Stein et al. |
| 7,567,291 B2 | 7/2009 | Bechtel et al. |
| 7,576,767 B2 | 8/2009 | Lee et al. |
| 7,586,400 B2* | 9/2009 | Nagaoka .............. B60W 50/14 340/425.5 |
| 7,605,856 B2 | 10/2009 | Imoto |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,671,725 B2* | 3/2010 | Tsuji .............. G06K 9/00369 340/435 |
| 7,711,201 B2 | 5/2010 | Wong et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,881,496 B2 | 2/2011 | Camilleri et al. |
| 7,925,441 B2* | 4/2011 | Maemura ............. B60T 7/22 340/435 |
| 7,930,160 B1 | 4/2011 | Hosagrahara et al. |
| 7,949,486 B2 | 5/2011 | Denny et al. |
| 8,009,868 B2 | 8/2011 | Abe |
| 8,017,898 B2 | 9/2011 | Lu et al. |
| 8,064,643 B2 | 11/2011 | Stein et al. |
| 8,072,486 B2 | 12/2011 | Namba et al. |
| 8,082,101 B2 | 12/2011 | Stein et al. |
| 8,108,097 B2* | 1/2012 | Mattes .............. B60T 8/17551 701/36 |
| 8,134,596 B2 | 3/2012 | Lei et al. |
| 8,164,628 B2 | 4/2012 | Stein et al. |
| 8,203,440 B2 | 6/2012 | Schofield et al. |
| 8,218,009 B2* | 7/2012 | Heinrich ............ G06K 9/00798 348/148 |
| 8,224,031 B2 | 7/2012 | Saito |
| 8,228,383 B2* | 7/2012 | Sugiura .............. H04N 5/23216 348/169 |
| 8,233,045 B2 | 7/2012 | Luo et al. |
| 8,237,794 B2* | 8/2012 | Moritz .................... G06T 7/215 348/148 |
| 8,254,635 B2 | 8/2012 | Stein et al. |
| 8,294,563 B2 | 10/2012 | Shimoda et al. |
| 8,300,886 B2 | 10/2012 | Hoffmann |
| 8,320,628 B2 | 11/2012 | Cheng et al. |
| 8,378,851 B2 | 2/2013 | Stein et al. |
| 8,421,865 B2 | 4/2013 | Euler et al. |
| 8,452,055 B2 | 5/2013 | Stein et al. |
| 8,502,860 B2 | 8/2013 | Demirdjian |
| 8,553,088 B2 | 10/2013 | Stein et al. |
| 8,712,162 B2* | 4/2014 | Kirsch ................ G06K 9/4671 382/195 |
| 9,205,776 B2 | 12/2015 | Turk |
| 10,099,614 B2 | 10/2018 | Diessner |
| 2002/0005778 A1 | 1/2002 | Breed et al. |
| 2002/0011611 A1 | 1/2002 | Huang et al. |
| 2002/0113873 A1 | 8/2002 | Williams |
| 2002/0181773 A1* | 12/2002 | Higaki .................... G06F 3/017 382/190 |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0032321 A1 | 2/2004 | McMahon et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0103727 A1 | 5/2006 | Tseng |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2010/0076621 A1 | 3/2010 | Kubotani et al. |
| 2011/0216201 A1 | 9/2011 | McAndrew et al. |
| 2011/0255747 A1* | 10/2011 | Iwasaki .................... G06T 7/223 382/103 |
| 2012/0045112 A1 | 2/2012 | Lundblad et al. |
| 2012/0069185 A1 | 3/2012 | Stein |
| 2012/0200707 A1 | 8/2012 | Stein et al. |

(56) References Cited

U.S. PATENT DOCUMENTS

| | | | |
|---|---|---|---|
| 2012/0243732 A1* | 9/2012 | Swaminathan | G06T 7/246 382/103 |
| 2012/0314071 A1 | 12/2012 | Rosenbaum et al. | |
| 2012/0320209 A1 | 12/2012 | Vico et al. | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0286193 A1 | 10/2013 | Pflug | |
| 2014/0043473 A1 | 2/2014 | Gupta et al. | |
| 2014/0063254 A1 | 3/2014 | Shi et al. | |
| 2014/0098229 A1 | 4/2014 | Lu et al. | |
| 2014/0247352 A1 | 9/2014 | Rathi et al. | |
| 2014/0247354 A1 | 9/2014 | Knudsen | |
| 2014/0320658 A1 | 10/2014 | Pliefke | |
| 2014/0333729 A1 | 11/2014 | Pflug | |
| 2014/0347486 A1 | 11/2014 | Okouneva | |
| 2018/0056874 A1* | 3/2018 | Lu | B60C 9/005 |

FOREIGN PATENT DOCUMENTS

| | | |
|---|---|---|
| EP | 2667325 A1 | 11/2013 |
| JP | H1168538 A | 7/1989 |
| JP | 200274339 A | 3/2002 |
| WO | 2012139636 A1 | 10/2012 |
| WO | 2012139660 A1 | 10/2012 |
| WO | 2012143036 A1 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.

Broggi et al., "Multi-Resolution Vehicle Detection using Artificial Vision," IEEE Intelligent Vehicles Symposium of Jun. 2004.

Kastrinaki et al., "A survey of video processing techniques for traffic applications", Apr. 2003.

Philomin et al., "Pedestrain Tracking from a Moving Vehicle", Oct. 2000.

Sahli et al., "A Kalman Filter-Based Update Scheme for Road Following," IAPR Workshop on Machine Vision Applications, pp. 5-9, Nov. 12-14, 1996.

Sun et al., "On-road vehicle detection using optical sensors: a review", IEEE Conference on Intelligent Transportation Systems, 2004.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Van Leeuwen et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

International Search Report and Written Opinion dated Jan. 31, 2013 for corresponding PCT Application No. PCT/US2012/066570.

* cited by examiner

Typical values: FOV_Range: about 5m; FOV_Width: vehicle width + about 0.5m

THE GRAPH BELOW SHOWS THE POI PLANE AND VECTOR OF A POI IN 3D SPACE. THE POI COORDINATE IS WHERE THE PLANE AND VECTOR INTERSECT.

THE IMAGE BELOW SHOWS ALL POIs IN THE SCENE
AND THE POIs IDENTIFIED AS PART OF THE CLOSEST OBJECT

THE IMAGE BELOW SHOWS THE INTENSITY IMAGE AND THE OBJECT IMAGE.

SMART CAMERA - MACHINE VISION

☐ LIVE CAMERA PICTURE
■ MACHINE VISION

- MACHINE VISION CAPABILITIES ARE BEING REQUESTED BY OEMs
  - OBJECT DETECTION
  - CROSSING TRAFFIC DETECTION
  - PEDESTRIAN DETECTION
  - LANE DETECTION
  - TRAILER ANGLE TRACKING
- ALGORITHMS SHOULD BE REUSABLE FOR TO MULTI CAMERA ECUs
  - SCALABLE SOLUTIONS
  - SAME IP IN MULTI- AND SINGLE CAMERA PROJECTS

SMART CAMERA - MACHINE VISION EXAMPLE

- UNIQUE FEATURE - POINT BASED OBJECT DETECTION SOLUTION
  - UNSUSCEPTIBLE TO BACKGROUND CLUTTER
  - OBJECTS DON'T NEED TO HAVE A CERTAIN SHAPE OR POSITION
  - FILTERS OUT LINES AND SHADOWS
  - YIELDS X, Y AND Z COORDINATES
  - SPATIAL RECONSTRUCTION MAP CAN BE EXTRACTED FROM THE CAR'S EGO - MOTION
- FEATURE BASED SOLUTION CAN BE EXTENDED TO DIFFERENT TASKS
  - LINE DETECTION
  - TRAILER ANGLE TRACKING

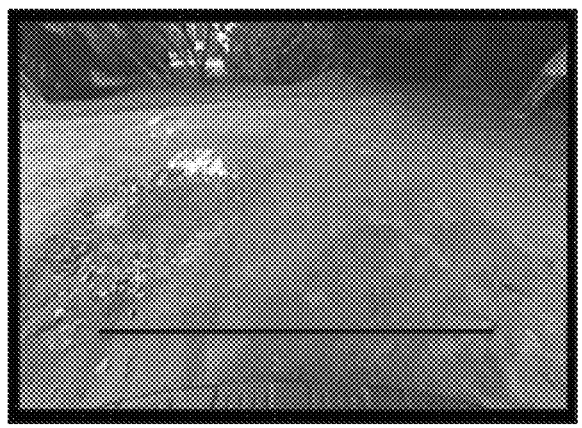

■ LIVE CAMERA PICTURE
— STATIC OVERLAY

FIG. 20

Smart Camera – General SoC Requirements

- AEC-Q100 Grade 2 qualified
  - −40° to +105°C ambient
  - OEM requirement for rear view camera is −40° to +85°C
- <500mW power dissipation
  - Fully operating
  - w/o machine vision
- 10x10mm BGA-type package
  - 15x15mm must not be exceeded
  - >0.5mm ball pitch

FIG. 35

Smart Camera – SoC MCU/Accel. Specifications

- MCU should be 32bit class
  - ARM Cortex M3/M4 or R4/R5 preferred due to broad support
  - PowerPC e200 or V850 may be preferred
  - \>100MHz preferred
  - Dual core setup preferred
  - Low power mode preferred
- AUTOSAR support preferred
  - Vector MicroSAR support preferred
  - MCALs may be provided
- HW machine vision accelerator option may be provided
  - Similar to EVE/IMAPCAR/etc.
  - May be fixed HW + MCU support
  - DSP/MAC-engine is preferred due to flexibility

FIG. 36

Smart Camera – SoC Memory Specifications

- >6MB RAM for image processing
  - at least two MP camera images may be held in memory
  - Internal SRAM for fast access preferred but not mandatory
  - DDR-RAM only as SiP/stacked solution due to size constraints
  - DDR-RAM should be mDDR or LPDDR2 due to power budget

- >1MB NOR Flash for code & data
  - Internal FLASH preferred
  - Two segments for code & data
  - External FLASH interface should be QSPI for enhanced performance

FIG. 37

Smart Camera – SoC Functional Safety

- Functional safety support preferred
  - Smart camera application may require ASIL level up to ASIL-B/C
- Dual core MCU/Accel. preferred
  - Doesn't have to be lock-step
  - Worker/checker concept
- HW BIST support preferred
  - HW self test for main components
  - CRC-checker for video data
- RAM & FLASH may support ECC
  - Internal caches with ECC support
  - If no ECC support is feasible, test vectors may be supplied for cyclic self test
- MPU support preferred
  - Memory protection unit is preferred
  - Read only access for periph. registers

FIG. 38

VEHICULAR VISION SYSTEM

CROSS REFERENCE TO RELATED APPLICATIONS

The present application is a continuation of U.S. patent application Ser. No. 14/359,340, filed May 20, 2014, now U.S. Pat. No. 10,099,614, which is a 371 national phase filing of PCT Application No. PCT/US2012/066570, filed Nov. 27, 2012, which claims the filing benefit of U.S. provisional applications, Ser. No. 61/605,409, filed Mar. 1, 2012, and Ser. No. 61/563,965, filed Nov. 28, 2011, which are hereby incorporated herein by reference in their entireties. And U.S. patent application Ser. No. 14/359,340 is a continuation-in-part of PCT Application No. PCT/US2012/066571, filed Nov. 27, 2012, which claims the filing benefit of U.S. provisional applications, Ser. No. 61/650,667, filed May 23, 2012, Ser. No. 61/605,409, filed Mar. 1, 2012, Ser. No. 61/579,682, filed Dec. 23, 2011, Ser. No. 61/565,713, filed Dec. 1, 2011, and Ser. No. 61/563,965, filed Nov. 28, 2011.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that is processed and, responsive to such image processing, detects an object at or near the vehicle and in the path of travel of the vehicle, such as when the vehicle is backing up.

According to an aspect of the present invention, a vision system for a vehicle includes an image sensor disposed at a rear portion of the subject vehicle and having an exterior field of view rearward of the vehicle, and a control operable to process image data captured by the image sensor to detect an object to the rear of the subject vehicle. The control is operable to process the image data to detect points of interest in the field of view of the image sensor and, responsive to the processing, the control is operable to determine movement of the detected points of interest. The control is operable to process the image data to determine movement vectors and, responsive to such processing, the control is operable to determine whether or not an object of interest is present in the field of view of the image sensor and rearward of the vehicle.

The control may determine that detected points of interest are part of an object of interest when at least one movement vector is greater than a threshold amount. The image sensor or camera may comprise a smart camera, with imaging circuitry and processing circuitry and the like incorporated into the camera or camera module.

These and other objects, advantages, purposes and features of the present invention will become apparent upon review of the following specification in conjunction with the drawings.

BRIEF DESCRIPTION OF THE DRAWINGS

FIG. 20 shows a summary of the various aspects and properties of the unique feature-point based object detection for use with a vision system according the present invention;

FIGS. 22-40 show various connections and system architecture and other aspects and constructions and features of a smart camera and associated accessories and systems for use with a vision system according the present invention.

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

The Object Detection (OD) algorithm and system of the present invention is operable to detect the closest object located behind a vehicle within a field of view of a single rearward facing camera at the rear of the vehicle. Any object which may be a hazard (i.e., may cause damage to the vehicle or may be an object that the driver of the vehicle would want to avoid) may be detected regardless of its size, shape and features. Such objects can be vehicles, posts, buildings, signs, pedestrians, bicycles, trash bins, fences, vegetation, etc. The OD algorithm is operable to report objects that are detected and for which it is determined with a height. Any objects flat on the ground, such as lane markings and road patches and/or the like, shall not be reported to the driver of the vehicle.

Figure 1:
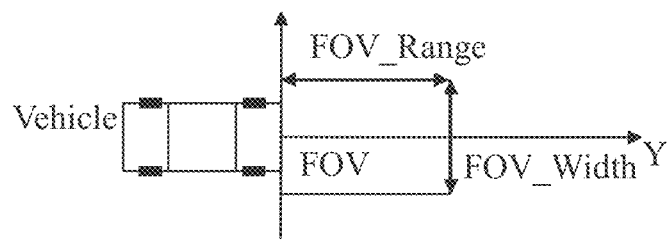
FIG. 1 is a plan view of a vehicle showing typical field of view range and width for an object detection system with a rearward facing camera disposed at a rear portion of the vehicle in accordance with the present invention.

The objective of the OD algorithm is not to classify objects (tell what object is in the FOV), but rather the OD system is operable to warn a driver that there is something behind the vehicle with which the vehicle could collide regardless of what that object is. The Field of View (FOV) of the OD system is shown in FIG. 1.

The algorithm shall allow adjusting the height of reported objects. This allows filtering of low objects, such as curbs and the like, whereby the OD algorithm may not report such low objects.

The algorithm is operable to measure the distance between the vehicle and the closest detected object. It is not required that the measured distance be highly accurate since most OEMs use the distance to drive some sort of a display with graphic overlays or segments, such as, for example, a green, yellow or red indicator (General Motors) or a LED bar with 8 segments (Chrysler, Mercedes) or a buzzer with different interval tones (Ford, Nissan), or the like. In cases where a numeric value is displayed, it should be sufficient to display the value that is within a 10 cm resolution.

The initial algorithm is operable to minimize or reduce false positives (e.g., where an object is reported when there is not an object present behind the vehicle), since this would be a nuisance to the vehicle operator. Because the camera images are displayed to the vehicle operator, false negatives (where an object is present but may not be reported as an object of interest) may be more acceptable.

The OD algorithm may be processed by a single chip embedded processor such as a TI OMAP (commercially available from Texas Instruments) or Analog Devices Blackfin or the like (or other image processor, such as, for example, an EYEQ™ image processing chip available from Mobileye Vision Technologies Ltd. of Jerusalem, Israel). The processing power of such devices is limited and significantly less compared to a PC. Therefore, the algorithm may not process the full image frame since each image frame contains about 640×480=307,200 pixels or greater or even about 1024×768=786,432 pixels or greater at a frame rate of 30 frames per second (or more or less frames per second). In order to limit the data to be processed, the image may be segmented into Points-of-Interest (POI) which are processed by the OD algorithm.

A Point-of-Interest is a pixel or pixels in the image with significance, possibly part of an object. A Point-of-Interest may be located on an edge or corner of an object or on a feature of an object with strong feature content, such as a logo or license plate. The POI shall be chosen in a way that it can be relocated in the next image frame, at the same location of the object even if the object and/or the camera moved or rotated. The POI segmentation is based on the image features, and thus it is expected that POIs will be located on objects with height as well as on objects on the ground plane, such as lane markings or the like.

The method used to generate the POIs is operable to prioritize on the stability of the POIs, ensuring that they are located on the same location of the object. Therefore, the algorithm may look for strong image features such as corners. Such a method or process will detect POIs on target objects (positives) and ground features (such as lane markings, false positives) in a similar manner. Thus, the false positives will have to be discarded by the OD algorithm.

A method detecting surfaces using unsharp masks and blob detectors might work very well to detect objects in the image while minimizing false positives; but such a method might not allow detecting the same feature on an object from frame to frame. The POIs thus may move around on the object causing errors in the Real World Transform (as discussed below).

The area surrounding a Point-of-Interest may be used to define a descriptor for each POI allowing relocating the same POI from frame to frame. The descriptor may contain information such as angles of edges, color data, intensity information, and/or the like. The descriptor shall be chosen in a manner that allows it to identify the POI even if the scene moves, such as if the object is moved or rotated or the camera is moved. These changes in the object presentation are limited by the frame rate of 30 fps (because object movement may be limited in a time frame of about 33 ms).

Figure 2:
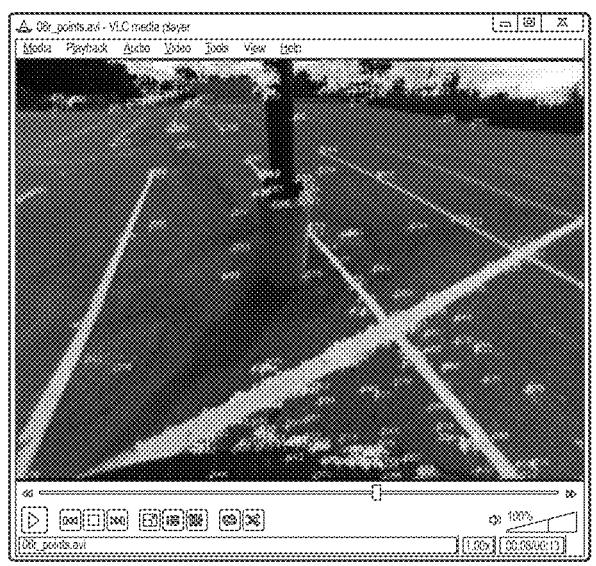
FIGS. 2 and 3 are images showing results of point of interest detections by the system of the present invention.
Figure 3:
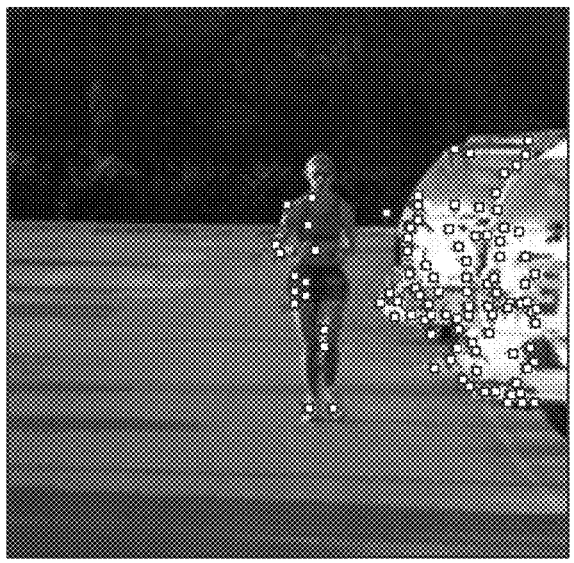

An OD approach using POIs is usually called sparse optical flow. Such POI detections are represented in the images of FIGS. 2 and 3. Optionally, the system may utilize one of two POI methods. The first method utilizes a Gaussian blur in conjunction with a Hessian blob detector. The descriptor utilizes a polar histogram of gradients. This method appears to have few false positives, but the POIs do not match the image features in a stable manner, and hence are not located on the same location on the object from one frame to another.

The second method utilizes an edge detector and a custom descriptor. Different methods for the edge detector can be used depending on the available processing power of the embedded platform. This could be for example a FAST9 corner detector or a Harris corner detector. Such a FAST9 corner detector or accelerated segment test or AST (as is known in the video arts) or FAST (Features from Accelerated Segment Test) may be used for the edge detector. For example, a FAST that uses a value of 3 (corresponding to a circle of 16 pixels circumference) can be used but preferably a FAST9, which uses a value of 9, is used. While a FAST9 corner detector (where a segment of at least 9 contiguous pixel is detected) may be preferred, other orders of FAST corner detection algorithms may be used in particular circumstances. This method produces more false positives compared to the first method but the POIs are very stable and suitable for the OD algorithm of the present invention.

The tracker analyzes all POIs using the POI pixel coordinate and the POI descriptor from frame to frame. The tracker identifies a configurable number of POIs (initially, for example, about 400), which can be tracked from frame to frame. The system will take the minimum distance (in pixels) between POIs into consideration and will also spread the POIs across the whole image (for example, all POIs at the horizon and not on an object in the foreground may not be acceptable).

If a new object enters the scene or an object moves closer due to motion and more features become available on the object, the tracker may assign new POIs to this object. Thus, an analysis of the current number of tracked POIs and their distribution across the image is provided. The tracker assigns an identifier (ID) to each tracked POI and provides a list of tracked POIs with their pixel coordinate and ID as output. The ID can be used by the following processing steps to identify the same POI in different frames.

An analysis of objects commonly occurring behind vehicles showed that there are four detection states:

Vehicle Stationary/Object Stationary

Vehicle Stationary/Object Moving

Vehicle Moving/Object Stationary

Vehicle Moving/Object Moving

Each detection state is fundamentally different in the way in which an object can be detected by the processing system; hence, a different algorithm may be developed and provided for each state. The control may comprise a state machine and may operate in one of each states or stages accordingly. Such a state machine (as known in the video arts) may comprise (i) an initial state or record of something stored someplace, (ii) a set of possible input events, (iii) a set of new states that may result from the input, and (iv) a set of possible actions or output events that result from a new state.

The state machine of the system of the present invention has at least the four different stages VEHICLE STATIONARY and OBJECT STATIONARY, VEHICLE STATIONARY and OBJECT MOVING, VEHICLE MOVING and OBJECT STATIONARY, VEHICLE MOVING and OBJECT MOVING. The control determines objects of interest that have been detected in a different stage or earlier stage when the control is in the stage VEHICLE STATIONARY and OBJECT STATIONARY. The algorithms of each individual state are described below.

Vehicle Stationary/Object Stationary:

The vehicle stationary/object stationary state or stage poses the problem that there is not enough information available to detect an object since there is no motion of the camera or object. Therefore, it may not be possible to detect the height of an object; the system would not be able to distinguish if there is a three dimensional (3D) object present or if an image of an object is painted on the ground. A two dimensional (2D) image would not reveal this information. An active detection of an object is therefore difficult in this state. Since there is no motion in this state, there is no danger of a collision between an object and the vehicle.

The OD algorithm therefore may only report an object previously detected in another state if both the vehicle and object are stationary. The location of a previously detected object would not change since there is no motion.

Vehicle Stationary/Object Moving:

The vehicle speed may be obtained by reading the wheel speeds, such as by using a vehicle CAN network. The system may determine that the vehicle is stationary if all 4 wheel speeds are zero.

Figure 4A:
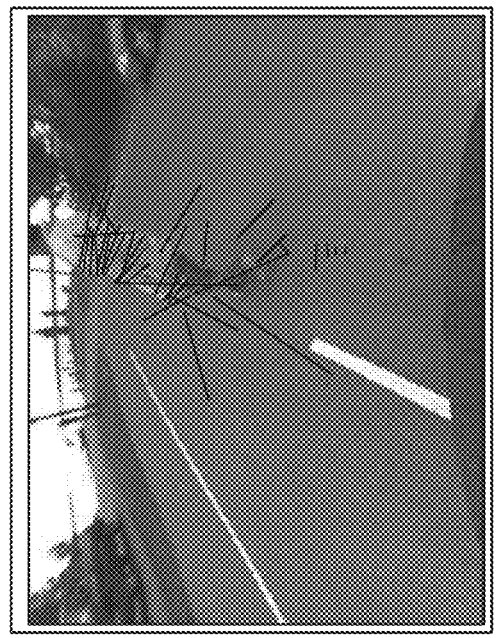
FIG. 4A is an image showing motion vectors attached to a moving blob or object.
Figure 4B:
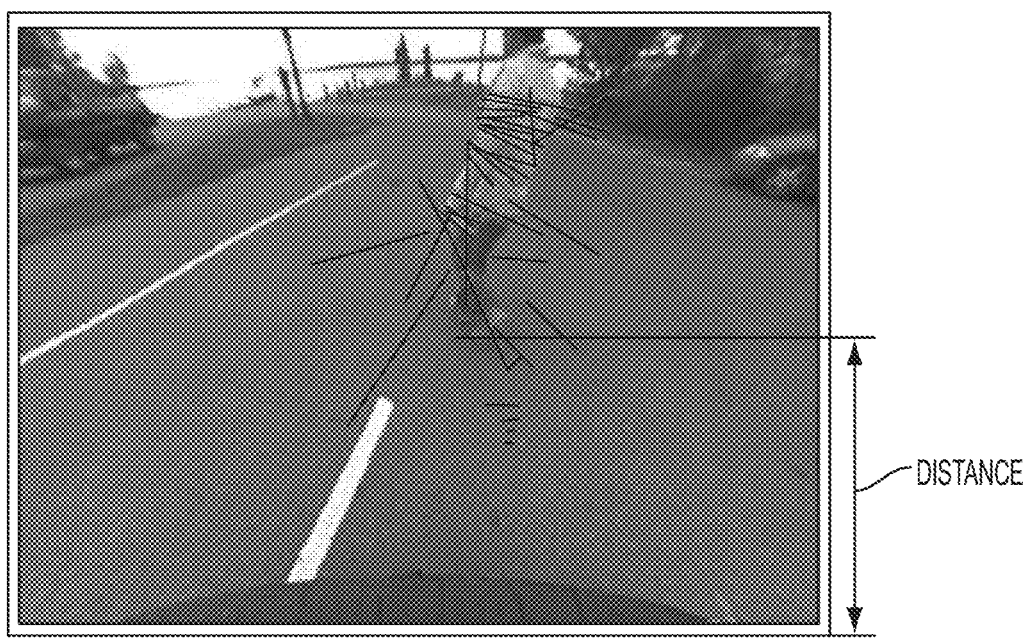
FIG. 4B shows a distance estimation to a moving object within a vehicle camera image.
Figure 4C:
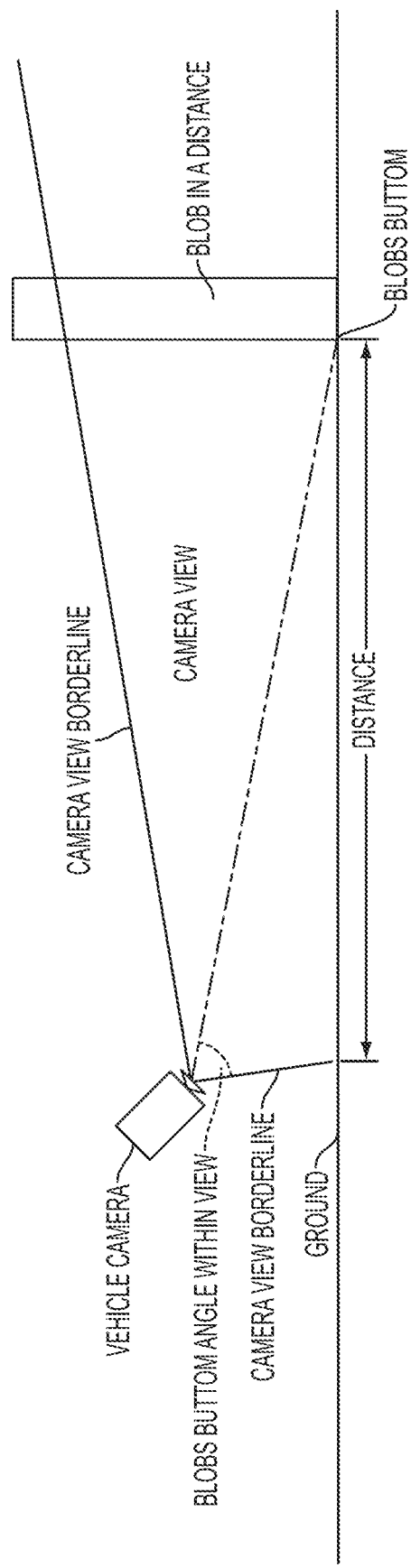
FIG. 4C shows a side elevation schematic of a distance estimation between the camera's viewing angle borderline to a moving object which is assumingly attached to the ground.

A motion vector can be calculated for each POI by subtracting the POI coordinate of the current frame and with the coordinate M frames ago. Each vector has a length and orientation (angle). Short motion vectors (such as, for example, less than 2 pixels) can be considered as noise and discarded. Therefore, there will be no motion vectors if there is no moving object in the scene. If the motion vectors are longer than a threshold length or number of pixels, the motion vector is considered part of an object. An example of motions vectors on or at a moving object is shown in FIG. 4.

Figure 5:
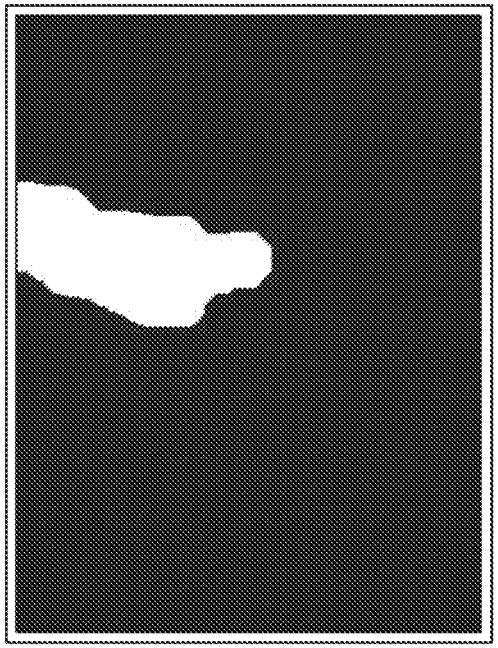
FIG. 5 shows an object image produced from extracting the object from FIG. 4A.

In order to locate the moving object in the camera images, an object image may be generated. The object image (such as shown in FIG. 5) is a binary image (only black and white pixels) with a reduced resolution in order to minimize the required computing power (for example: if the camera resolution is 640×480, the object image may be 640/4×480/4=160×120 pixels). The initial object image may contain only black pixels. Each starting point of a valid motion vector (the coordinate of a POI in the current frame or captured image) is set to be a white pixel in the object image. Therefore, all pixels which are detected to be moving in the current frame are white, all stationary pixels are black.

As shown in FIG. 5, the white image regions grow and merge together into one object. This is accomplished using morphology operations (dilate/erode) with a disk as a structure element.

The centroid of the white area represents the location of the object in the camera image. An overlay icon may be displayed at this location to warn the vehicle operator about the moving object. The distance to the object can be estimated assuming that the bottom of the object is connected to the ground plane. Therefore, the pixel row of the bottom of the object can be used to calculate the estimated distance taking camera mounting height and the horizontal camera angle into account. A pinhole camera model can be assumed for this calculation.

Figure 6:
FIG. 6 shows motion vectors (produced by tracking features/POI over two or more or multiple frames) due to very slow vehicle movement, while the speedometer reads 0 [km/h]

The challenge with this approach is that the wheel speeds obtained from the vehicle may read a zero speed or about zero even if the vehicle is moving very slowly (FIG. 6). The reason is that common wheel pulse counters do not provide a reliable reading for speeds less than about 1 km/h. This will cause the algorithm described above to detect motion in the case that the vehicle starts moving but the wheel speeds are still reading zero. It is desirable that such false positive detections are to be avoided since they present nuisance to the driver.

Testing has showed that the motion vectors can have a length of up to 7 pixels until the wheel pulse counters start working properly and the vehicle motion can be properly identified using the wheel speeds. Thus, in the illustrated embodiment, the threshold vector length in order to detect object motion may be set to greater than (or greater than or equal to) about nine (9) pixels in order to suppress these false positive detections. This in turn may result in not enough motion vectors remaining on a moving object in order to have stable moving object detection. If all "good" motion vectors were also filtered, the object detection may become unstable.

Particular problems may be found with walking pedestrians since the feet of a person may be too small in the camera image due to the mounting height and angle of the camera (camera is looking down). Thus, the moving feet may not be detected properly causing the distance estimation to fail. Therefore, it may be desirable to use a sparse optical flow (of POIs) to detect the vehicle motion but dense optical flow to detect moving objects.

Figure 8:
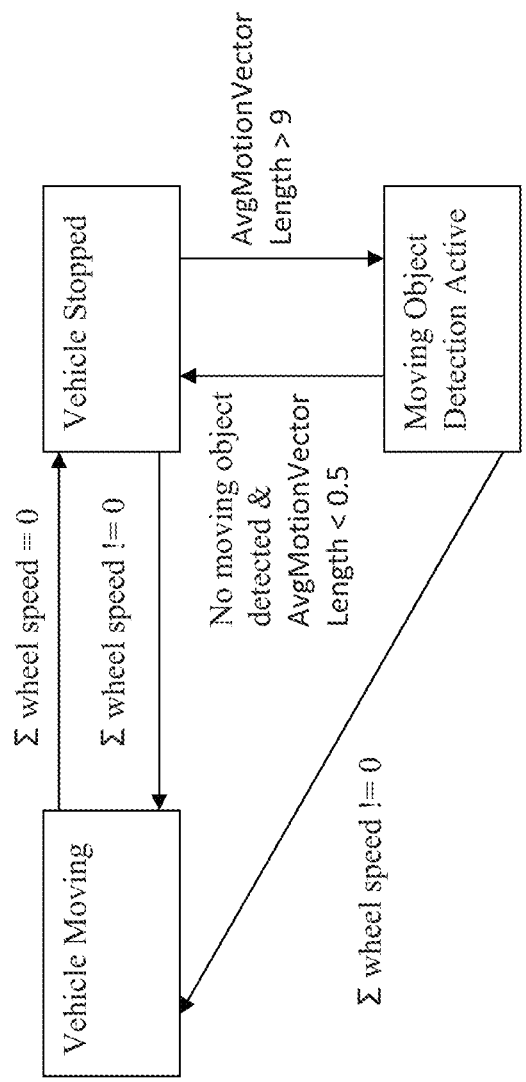
FIG. 8 is a block diagram of system status that determines the activation of the moving object detection for the object detection system of the present invention.

The state machine of FIG. 8 determines the activation of the moving object detection. The AvgMotionVectorLength is the average length of all motion vectors below the horizon (in the image foreground). The detection of moving objects is only active in the state "Moving Object Detection Active".

Figure 7:
FIG. 7 shows a differential image generated out of a steady scene (no vehicle movement) having a moving object within view (such as when the control is in the processing state: Vehicle Stationary/Object Moving), such as a moving object as shown in FIG. 4A.

As shown in FIG. 7, a differential image may be produced by subtracting the current gray-scale camera frame from a previous gray-scale camera frame (for example 4 frames earlier). The image can be resized to a lower resolution before the subtraction in order to decrease computing power for this operation. The differential image will show areas in the image which are moving.

The differential image may then be converted into a black and white object image. All pixels above a defined intensity are set to white, while all other pixels are set to black. The white image regions are thus grown or enlarged so that they merge together into an object or objects. This is accomplished using morphology operations (dilate/erode) with a disk as a structure element. This operation produces the object image. Each white image region represents a moving object. Additional filtering may be desired or required to remove noise and to produce a stable output.

A search algorithm finds all connected white image regions in the image. Each white image region represents an object. Each object can be described by the following parameters:
 Centroid
 Bounding box
 Surface area
All objects with a surface area smaller than a threshold may be discarded. This removes noise but also removes small moving objects, such as, for example, leaves blown by the wind, moving foliage of bushes, trees and/or the like.

The closest object is typically the object which extends furthest down in the image. This object will be reported in the system output. The bottom edge of the bounding box of the closest object can be used to calculate the estimated distance, taking the camera mounting height and the horizontal camera angle into account. A pinhole camera model can be assumed for this calculation.

The detection of the centroid and distance using the method above may yield a somewhat unstable output. Thus, additional filtering may be required or desired. The output shows two major problems: 1. intermittent detection and 2. unstable or "jumpy" output.

Optionally, a prediction filter may be implemented to overcome intermittent detections. All parameters describing the closest object may be stored in a ring buffer with 24 elements. Therefore, up to 24 previous detections are available to be used by the prediction filter. In case the object is not detected in the current frame, the filter may predict the object centroid and distance using the previous positive detections. The ring buffer may contain at least 8 positive detections out of the previous 24 frames. The current (missing) detection may be predicted by linearly interpolating a function for each of the centroid coordinate (column and row) and the distance. The current centroid and distance is calculated using this interpolated function. The predicted centroid and distance is added into the ring buffer for the current frame.

The prediction filter may predict the object for up to 8 consecutive frames using the method described above. If the object is not detected for 8 consecutive frames, the object will not be reported anymore.

If an object enters the field of view, the detection of the object may be intermittent. The predication filter may not work properly at this time since the ring buffer is not filled yet. Therefore, a confirmation filter may be used that will allow an object only to be reported if the object was detected for K consecutive times (with K being a number selected that provides suitable confidence that the multiple (K) detections accurately indicate detection of an object). Once the object is detected K times, the filters work together ensuring a more stable the output.

Optionally, a statistical filter may be used to filter the output against jumps in the reported distance and object location. The statistical filter may use the same ring buffer as the prediction filter. The statistical filter may interpolate a linear function for each of the centroid coordinates (column and row) and the distance in case the ring buffer contains at least 12 positive detections out of the previous 24 frames. The statistical filter may calculate the expected object using the interpolated functions. The actual current object may then be compared with the expected object. Adjustments to the reported object can be made in order to filter out any unstable behavior.

Optionally, a Kalman filter may be implemented in order to reduce the jitter in the output. The Kalman filter is an algorithm which operates recursively on streams of input data (centroid and distance) to produce a statistically optimal output estimate. The predicted output may be calculated by summing the weighted current sample and weighted previous output. The predicted output and current sample may be processed using the respective standard deviations achieving a statistically optimal output.

The final reported object may be filtered with an infinite impulse response low pass filter using the last and current reported object.

In testing, a particular concern was found with objects that move away from the vehicle until they exit the field of view but then turn around and reenter the field of view. The object (for example a walking pedestrian) may not be detected immediately entering the field of view at the maximum field of view range. The reason is that the image area of the object is smaller when it enters the field of view at a distance as compared to when a moving object enters the field of view at a closer range. Therefore, an average motion vector length ("AvgMotionVectorLength") may not exceed the threshold, causing the machine to not enter into the "Moving Object Detection Active" state.

This problem may be overcome by tracking the moving object until the distance to the moving object exceeds a predetermined or threshold distance (such as two times the field of view range (2*FOV Range) or other suitable distance). The OD algorithm therefore continues to detect an object even if it is outside the field of view. The OD algorithm may not report the object to the vehicle operator in this case (when the object is outside of the field of view), but if the tracked object reenters the field of view, it can be immediately reported.

Figure 9:
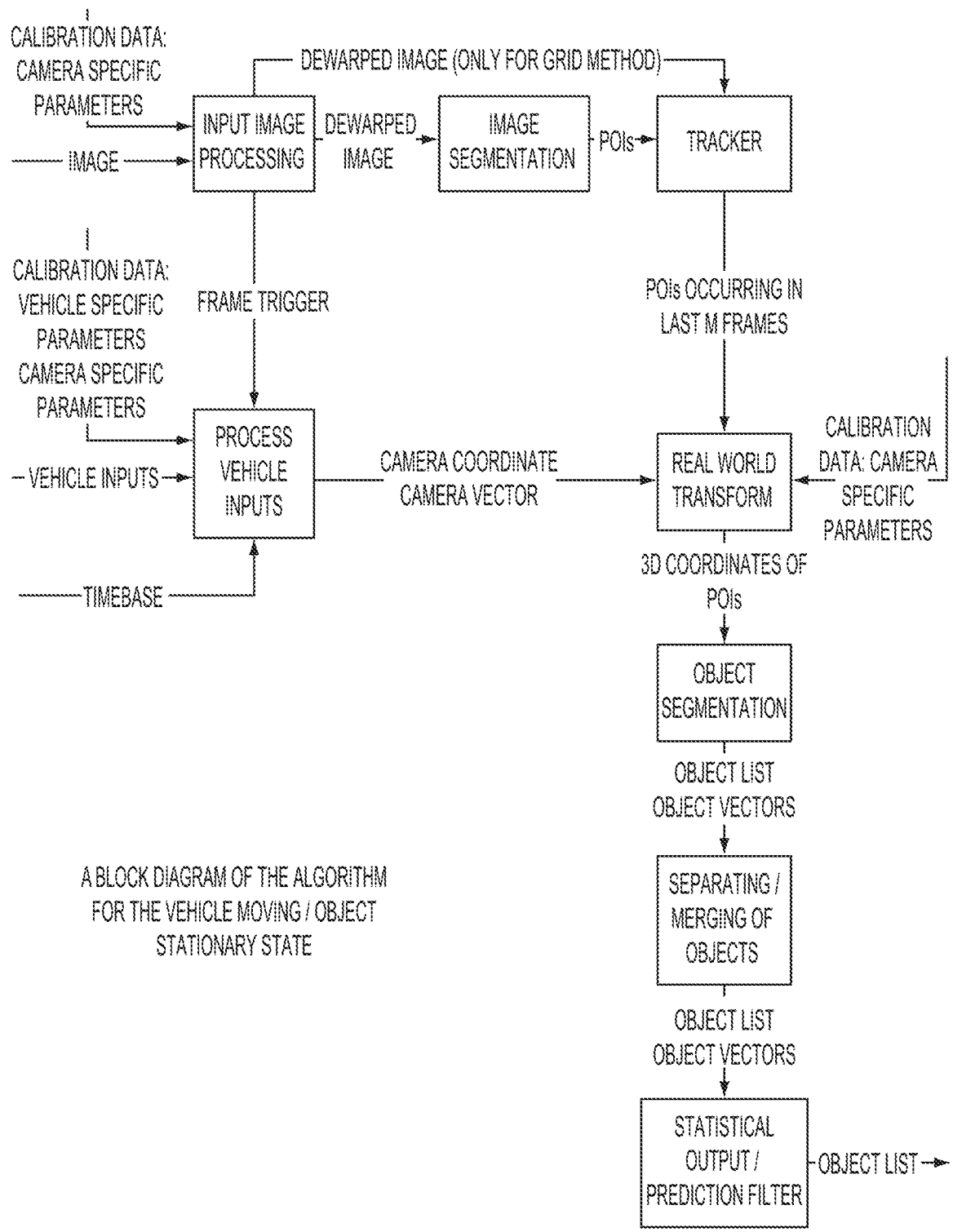
FIG. 9 is a block diagram of an algorithm for the vehicle moving/object stationary state of the object detection system of the present invention.

Vehicle Moving/Object Stationary:

When the object is stationary and the vehicle is moving, a similar approach as stereoscopy can be used. In stereoscopic systems, there are two camera images taken at the same time. In the system of the present invention, two images can be taken at different times and the vehicle motion may deliver the stereoscopic base. A block diagram of the algorithm for the vehicle moving/object stationary state is shown in FIG. 9.

Figure 10:
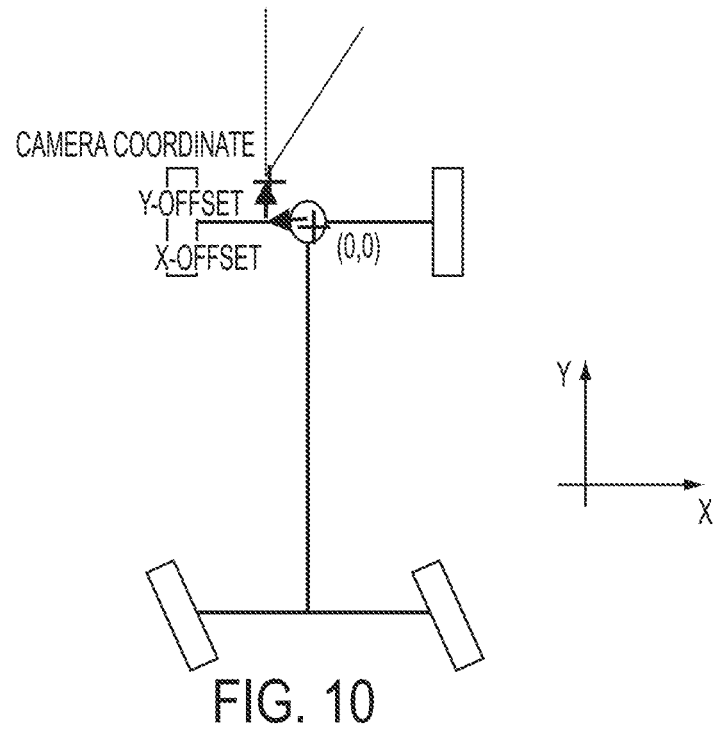
FIG. 10 is a schematic of a camera focal point or camera coordinate as defined by a X-offset and Y-offset relative to the vehicle coordinate.

Process Vehicle Inputs:

The center of the rear axle of the vehicle may mark the vehicle coordinate. Upon activation of the object detection system (for example: selection of reverse gear), the vehicle coordinate system is set to the origin of a world coordinate system with an angle of 0 degrees (such as shown in FIG. 10). The vehicle main axis is lined up with the y-axis of the world coordinate system.

As the vehicle is moving, the vehicle position can be defined by its coordinate in the world coordinate system and vehicle angle relative to the y-axis of the world coordinate system. The camera focal point or camera coordinate is defined by a X-offset and Y-offset relative to the vehicle coordinates.

The system or algorithm may include a block "process vehicle inputs," which tracks the camera coordinates and camera angle relative to the world coordinate system. In order to do this, the vehicle coordinate and vehicle angle is tracked in the world coordinate system using the wheel speeds and steering angle data, such as may be received through the vehicle network bus or vehicle CAN network or the like. The time-base of the tracking of the vehicle is the frame rate of the camera. Therefore, the block "process vehicle inputs" calculates the camera coordinate and orientation every time when a new frame is captured.

This allows calculating how much the camera moved in X and Y and how much the camera rotated between frames. A buffer of M frames is maintained in order to determine how much the camera moved and rotated between the current frame N and a previous frame N-M. Therefore, the block "process vehicle inputs" provides the stereoscopic base for two or more images taken of a scene.

The average camera speed may also be calculated. The average camera speed is defined as the distance the camera moves between the frames N and N-M, divided by the time elapsed between frames N and N-M. The detection of stationary objects using the vehicle motion is possible if the average camera speed is greater than a threshold amount. This ensures that the camera moves enough to provide a sufficient stereoscopic base for the Real World Transform described below.

Input Image Processing:

The transform described in the block "Real World Transform" uses a pin hole camera model. Therefore, it is desirable that the camera image be substantially or entirely or 100 percent dewarped. The dewarping can be done either:

In the imager
Before the image segmentation
Applied to the POIs after the tracker In case the dewarping cannot be done in the imager, it may be desirable to apply the dewarping to the POIs after the tracking. This would minimize the required processing power and may increase the accuracy of the segmentation/tracker since the raw image would be used by these blocks.

Real World Transform:

The real world transform uses a POI occurring in frame N and N-M and the coordinate and orientation of the camera in frame N and N-M, in order to transform the POI into the real world coordinate. The transformed POI will have X, Y and Z coordinates, hence its location is known in 3D space.

Figure 11:
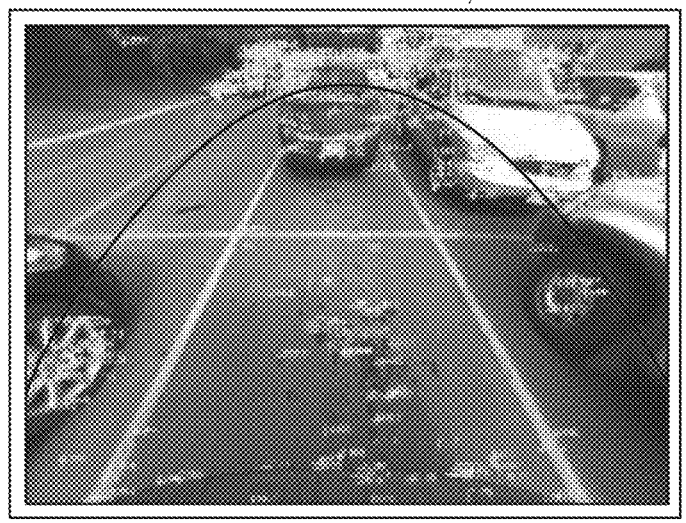
FIG. 11 is an image showing use of a point of interest parabola in detecting points of interest in accordance with the present invention.

Most POIs occur on the horizon in a scene. Since the horizon is not part of the OD system's area of interest, these POIs can be discarded before the Real World transform is performed. In order to do so, a second order function may be interpolated in order to define the Region-of-Interest (ROI) in the camera image. All POIs above the parabola are discarded, all POIs below the parabola are used. An exemplary ROI parabola is shown in FIG. 11.

In order to filter noisy POIs that are not located on the same location of an object, a POI motion vector may be calculated for each POI by subtracting the POI coordinate of frame N with the POI coordinate of frame N-M. The length of the POI vector can be calculated using Pythagoras.

The length of the POI motion vector depends largely on the vehicle speed and location of the POI vector in the image. The closer the vector is to the horizon, the shorter the vector will be. Therefore, a formula of the present invention may calculate a POI motion vector length threshold based on speed and image location. All POIs that have vectors that are longer than the threshold are rejected. This removes the noise in the POI data considerably. All of the remaining POIs may be transformed using the Real World Transform described below.

The pixel row of the POI in frame N-M is used to describe a plane ($POI_{plane}$) mathematically in the format $\overrightarrow{POI_{Plane}} = \alpha^* \overrightarrow{V1} + \beta^* \overrightarrow{V2}$, where $\overrightarrow{V1}$ and $\overrightarrow{V2}$ are vectors from the focal point of the camera to the outer edges of the imager at pixel column 0 and pixel column 639 at the row of the POI (assuming the resolution is 640×480). $\alpha$ and $\beta$ are unknown and express the lengths of the vectors $\overrightarrow{V1}$ and $\overrightarrow{V2}$.

The pixel coordinate of the POI in frame N is used to describe a vector ($POI_{vector}$) mathematically in the format $\overrightarrow{POI_{vector}} = \gamma^* \overrightarrow{V3}$, where $\overrightarrow{V3}$ is the vector from the focal point of the camera to the pixel. $\gamma$ is unknown and expresses the length of the vector $\overrightarrow{V3}$.

Figure 12:
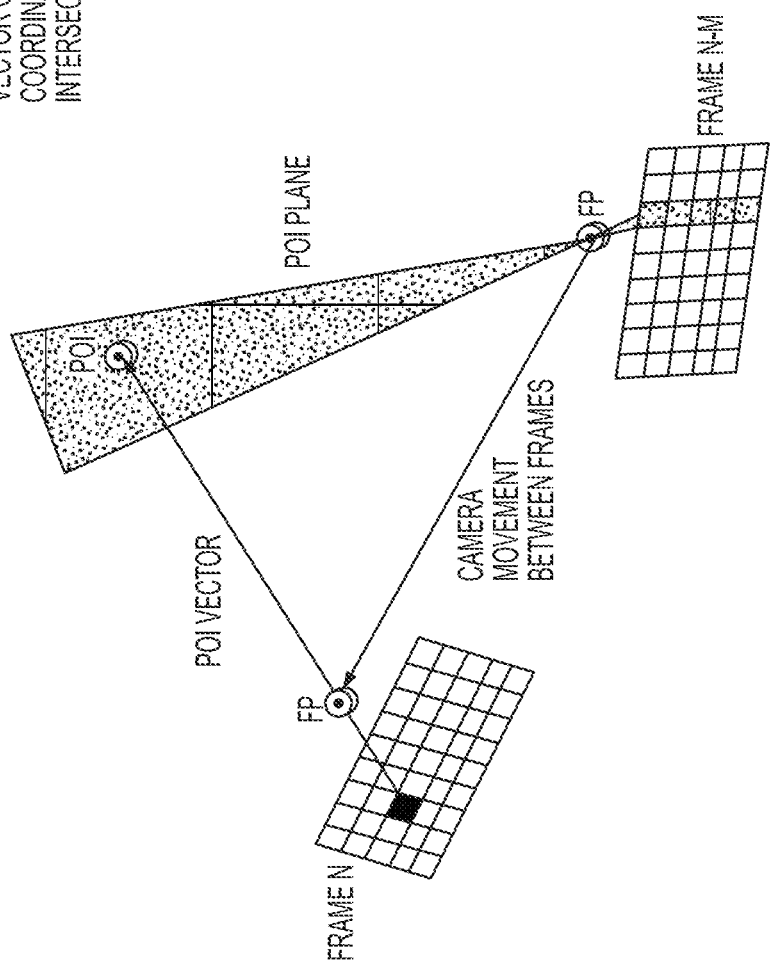
FIG. 12 is a schematic showing the transformation of a point of interest when the vehicle and camera move.

Parameters, such as the imager size, imager resolution, focal length, camera rotation between frame N and N-M and the like, may be taken into account into the mathematical description of the $\overrightarrow{POI_{Plane}}$ and $\overrightarrow{POI_{vector}}$ (see FIG. 12).

The block "process vehicle inputs" delivers the $Camera_{Movement}$ vector $\overrightarrow{Camera_{Movement}}$. This allows the system to formulate the following linear system: $\overrightarrow{Camera_{Movement}} = \overrightarrow{-POI_{Vector}} + \overrightarrow{POI_{Plane}}$. This linear system of equations contains three equations (for X, Y, Z) and three unknowns ($\alpha$, $\beta$, $\gamma$), and can thus be solved using a method, such as Euler or Gauss or the like. It is sufficient to solve the system only for the unknown $\gamma$. Once $\gamma$ is known, it can be entered into the equation $\overrightarrow{POI_{Vector}} = ^* \overrightarrow{V3}$, and the 3D coordinates of the POI can be calculated.

The calculations above will provide the 3D coordinate relative to the camera focal point of the camera at frame N. A final transform will move the 3D coordinate into the vehicle coordinate system.

Figure 13:
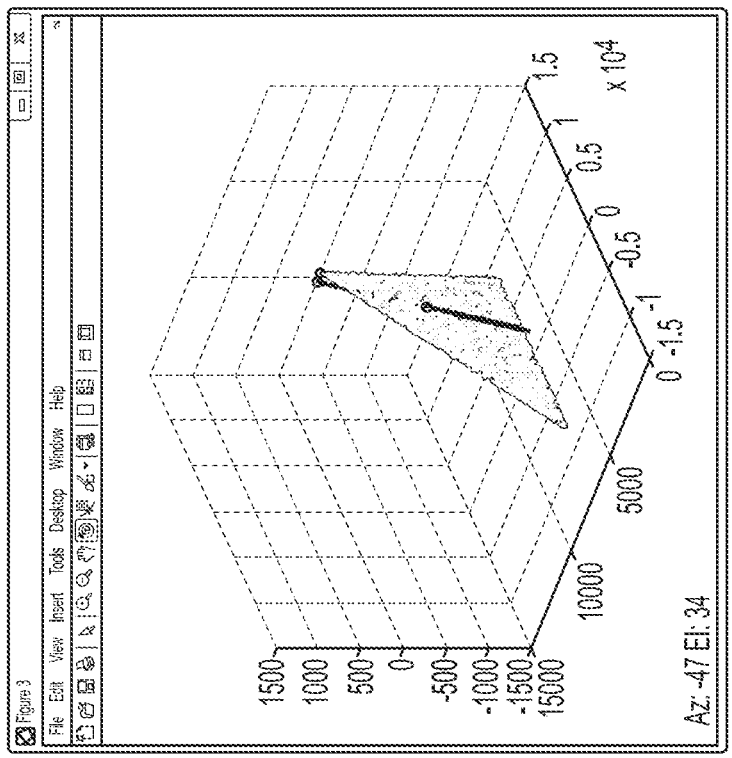
FIG. 13 is a graph showing the POI plane and vector of a POI in three dimensional space, with the POI coordinate being where the plane and vector intersect.

The graphs of FIGS. 12 and 13 show the POI plane and vector of a POI in 3D space. The POI coordinate is where the plane and vector intersect.

All POIs that are located on the ground plane (such as POIs due to lane markings or the like) can be removed from the 3D data using their Z-coordinate. Also, the desired field of view (FOV) can be applied using the X-coordinate and Y-coordinate. The 3D data should contain only POIs that are part of objects located inside the FOV.

Object Segmentation/Merging of Objects:

In the next step, all POIs that are part of the closest object are to be identified. A search through the 3D POI data finds the closest POI to the vehicle. The distance between the closest POI and the vehicle is the distance reported to the vehicle operator. A second search though the POI data will identify all POIs which have the same distance plus a tolerance. All these POIs are determined to be part of the closest object.

Figure 14:
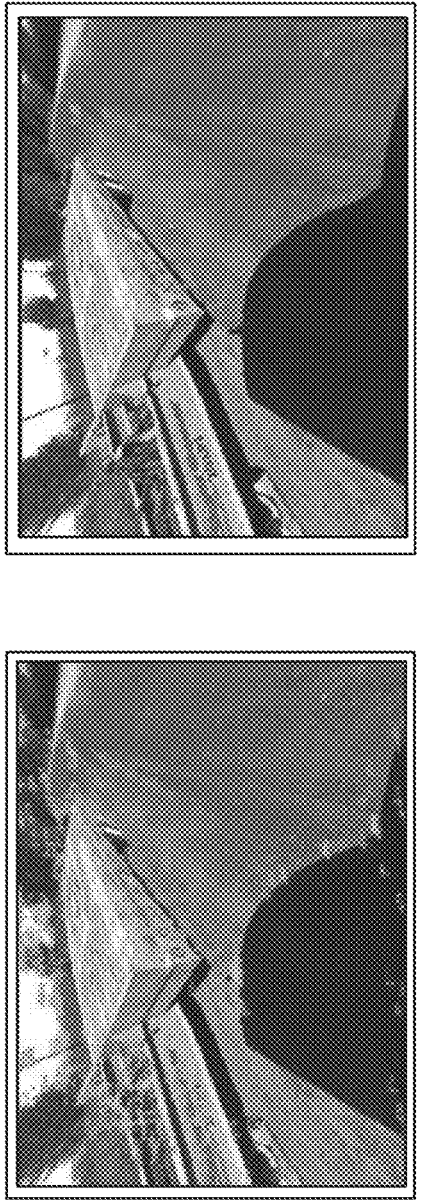
FIG. 14 shows images of all of the POIs in the scene, and of the POIs as identified as part of the closest object using the object detection system of the present invention.

The images shown in FIG. 14 shows all POIs in the scene and the POIs that are identified as part of the closest object using the method above.

All of the POIs that are identified to be part of the closest object will be stored in a ring buffer with four elements. Therefore, all POIs that are part of the closest object and have been detected in the last four frames can be recalled.

This data is used when the average camera speed falls below the threshold allowing the Real World Transform (vehicle enters stationary state). In this case, a search algorithm looks through the POIs of the current frame and identifies any POIs with the same ID as the POIs that were identified to be part of the closest object in the last four frames when the Real World Transform was still running. Therefore, the object can be tracked in the image even though the average camera speed is not enough anymore to perform the Real World Transform (i.e., the vehicle is stationary or moving slowly). The distance to the closest object can be determined by subtracting the distance the vehicle moved since the object was detected the last time. This process is called object tracking during low speeds/tracking of stationary objects while speed=zero.

Next, an object image may be generated. The object image (FIG. 5) is a binary image (only black and white pixels) with a reduced resolution in order to minimize the required computing power (for example: if the camera resolution is 640×480, then the object image may be 640/8×480/8=80×60 pixels). The initial object image contains only black pixels. Each POI pixel coordinate that was identified to be part of the closest object is set to a white pixel in the object image.

An intensity filter may be applied in order to filter any sporadic POIs that are thought to be part of a real object but in fact are on a ground feature. Such errors occur if a POI is not stable on the same location, such as if the POI slides and moves around somewhat. Such errors may be caused by the image segmentation and tracker. A spatial filter may be applied to the object image. The window size of the spatial convolution filter may be adjusted based on the distance to the closest object since an object appears larger in an image the closer it is to the vehicle and camera. The filter matrix of the spatial filter contains all ones, hence this spatial filter will indicate how many POIs are in an image region, and thus it indicates the POI intensity. The output of the intensity filter is an intensity image of the same size as the object image (see FIG. 7).

A new object image may then be generated but this time only POIs will be added if the intensity at this location is greater than 2 POIs. Therefore, single occurring POIs without any POIs in their neighborhood will be removed.

Figure 15:
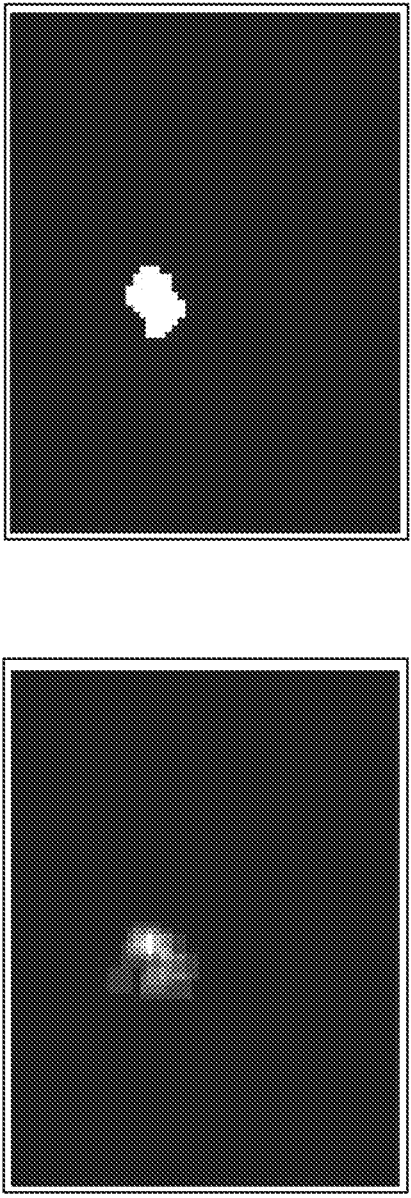
FIG. 15 shows an intensity image and an object image in accordance with the present invention.
Figure 16:
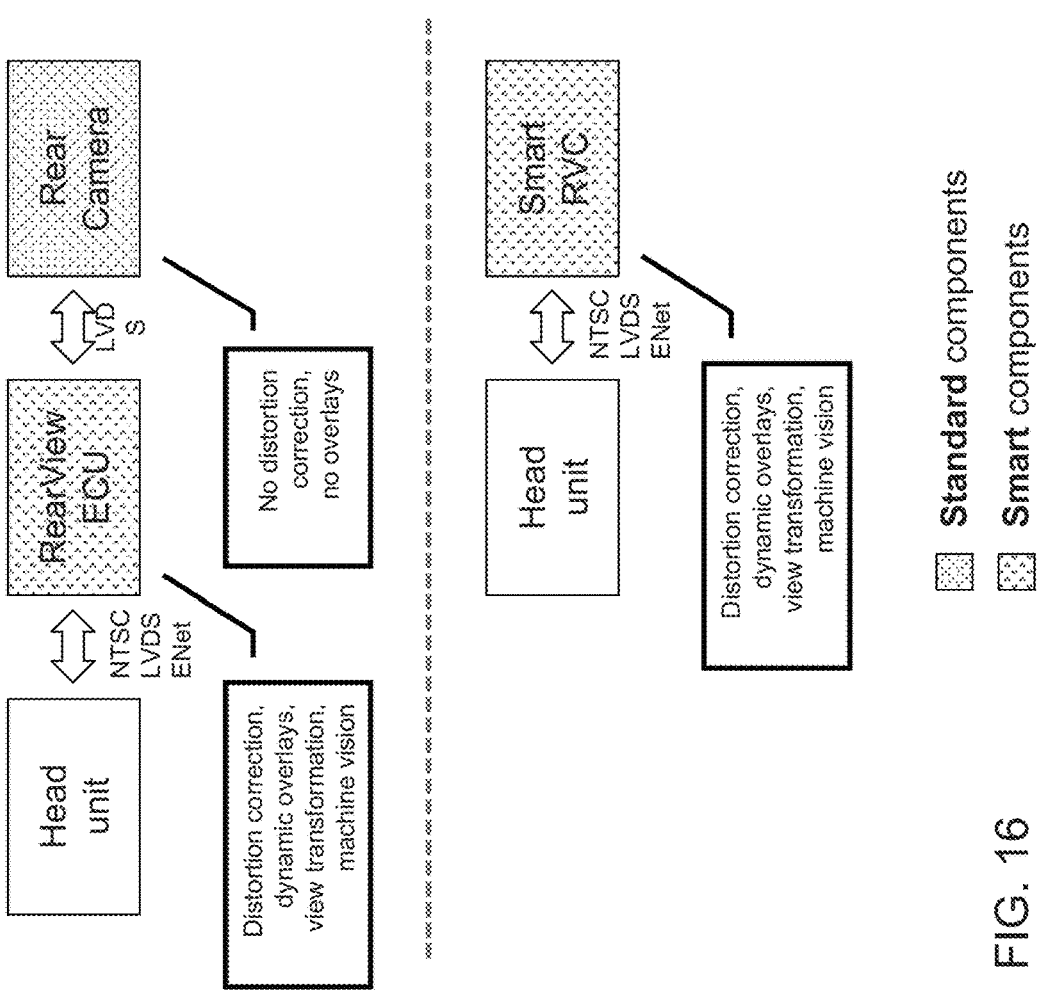
FIG. 16 shows an overview of a smart camera suitable for use with a vision system of the present invention.
Figure 17:
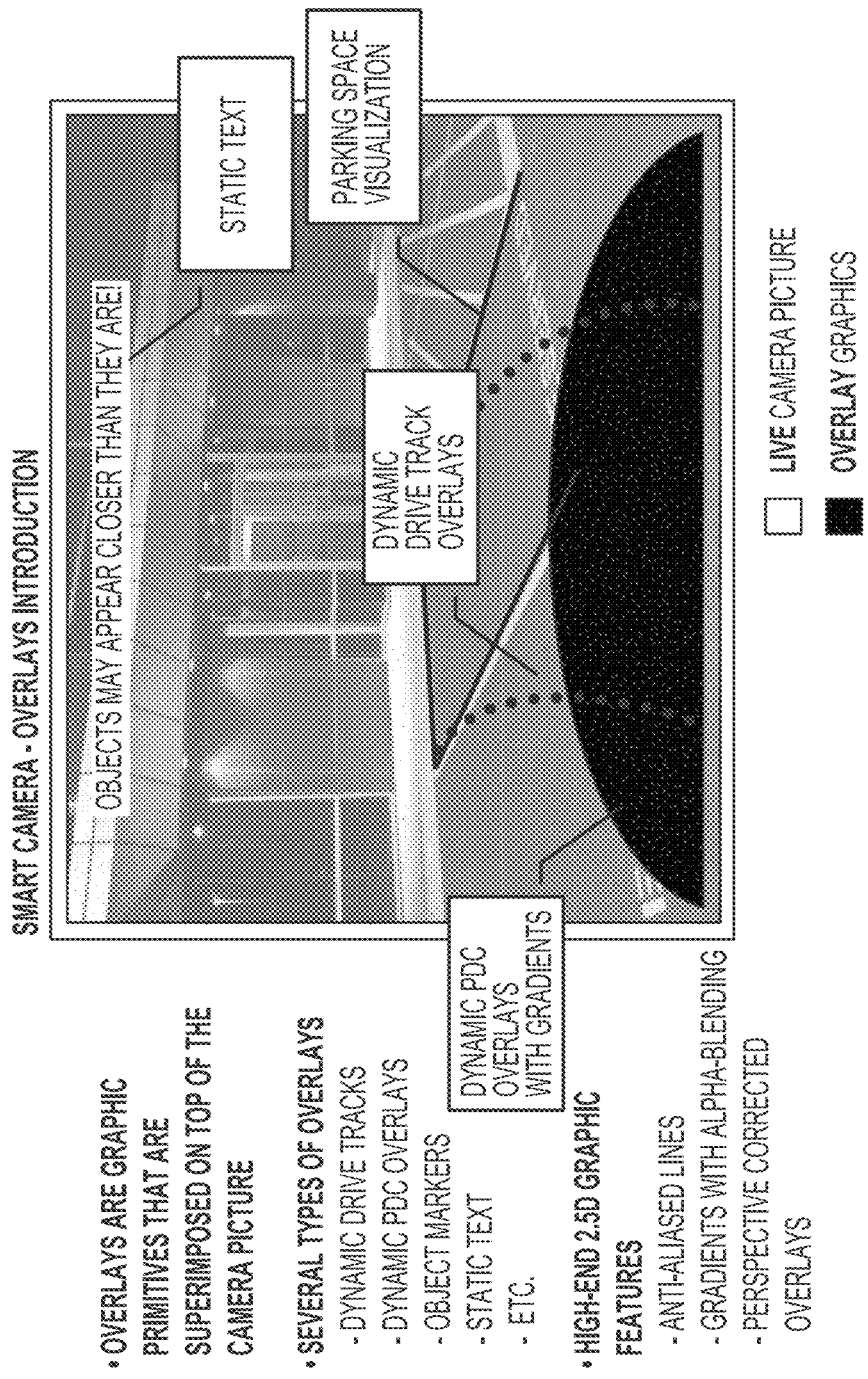
FIG. 17-19 show view transformation and machine vision capabilities of the smart camera of FIG. 16.
Figure 18:
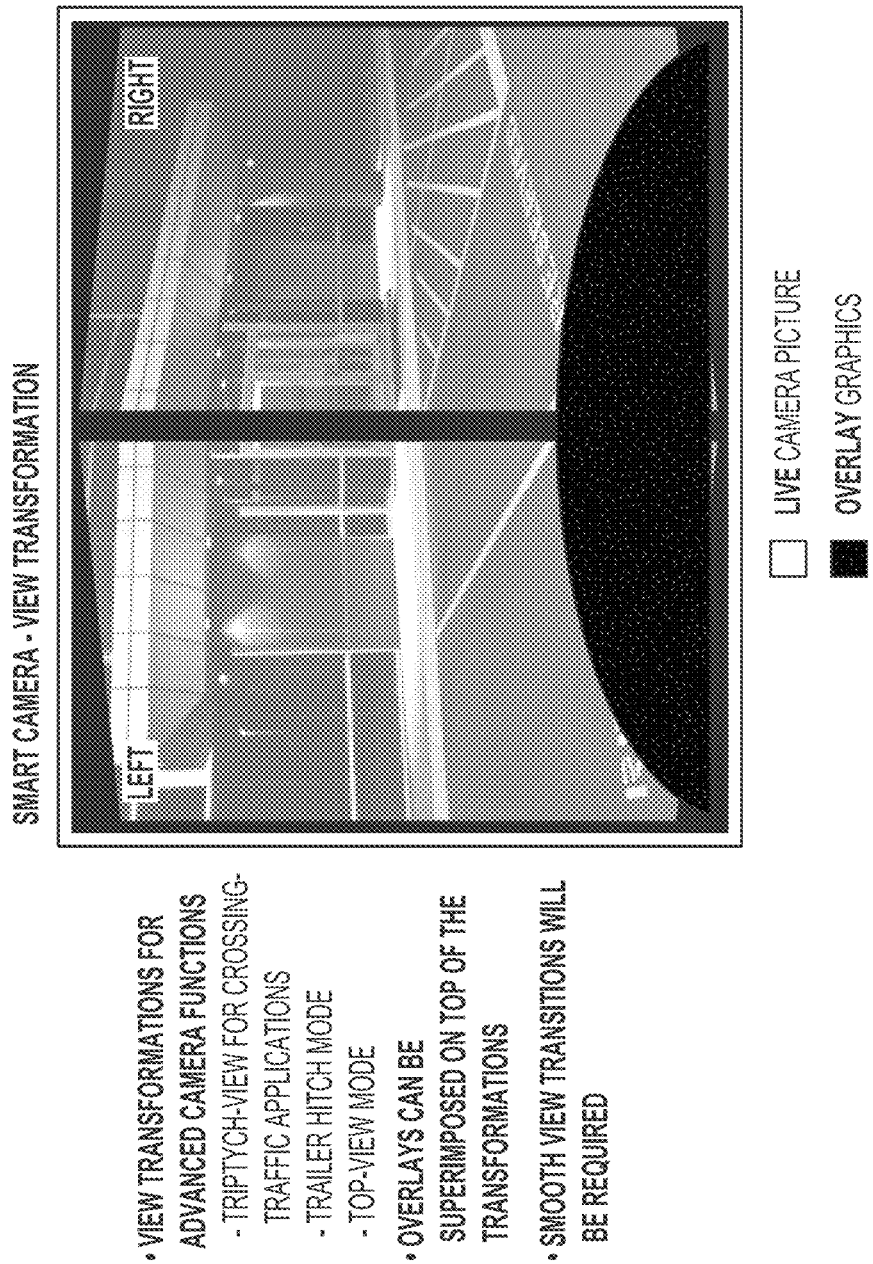
Figure 19:
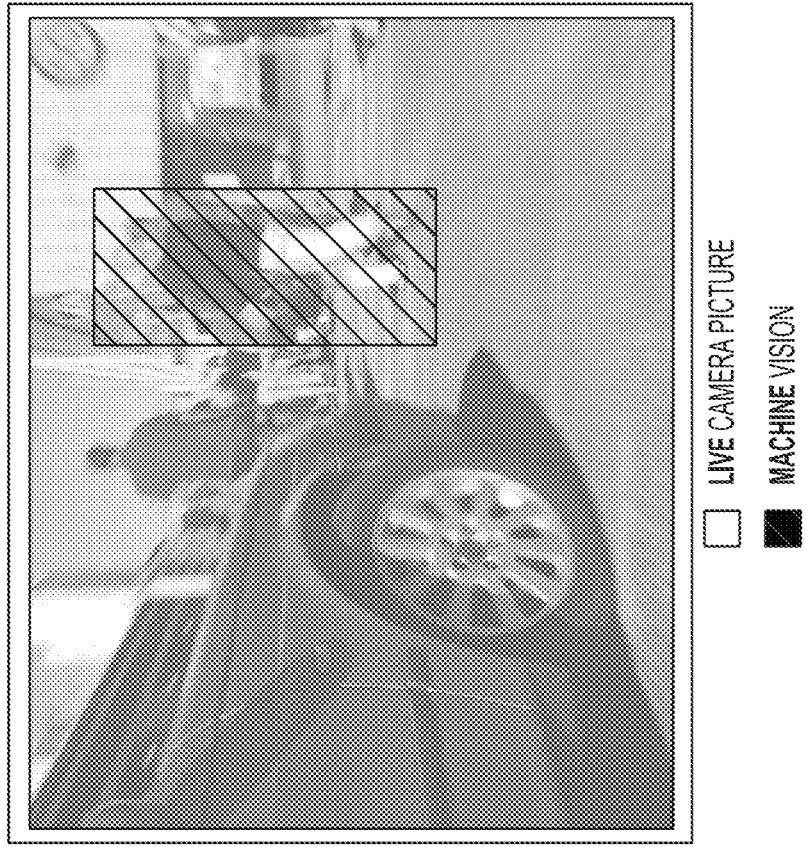
Figure 21:
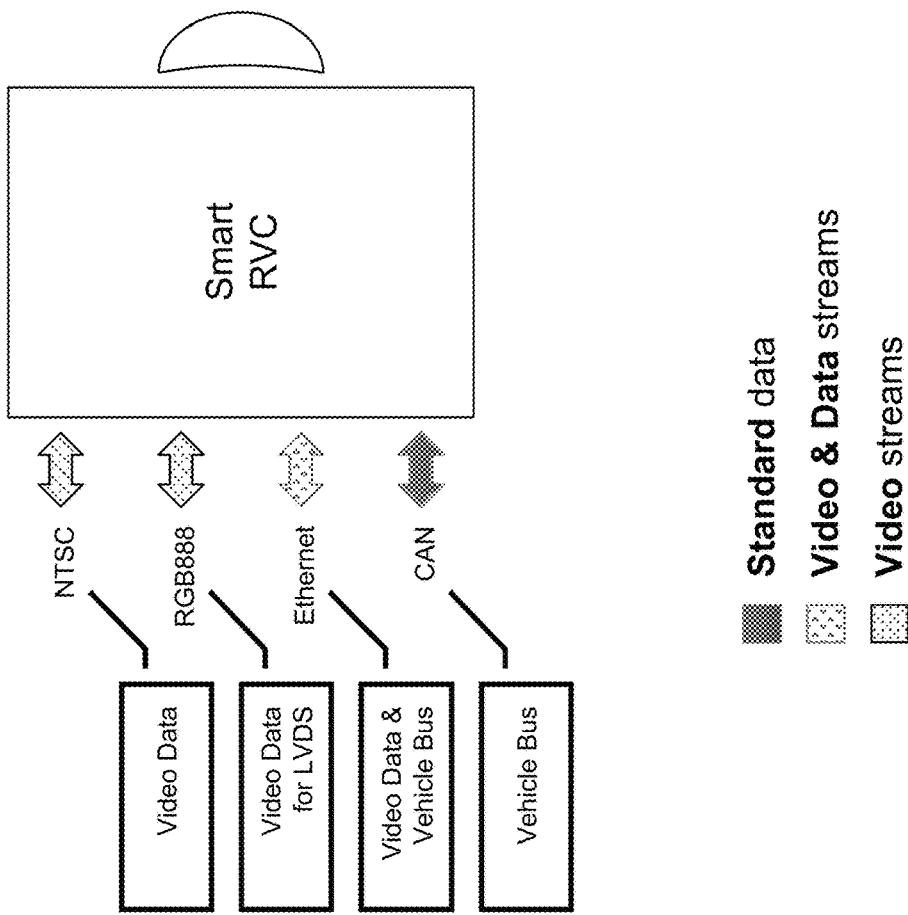
FIG. 21 is a schematic showing a possible architecture solution when the invention's processing algorithm are integrated to a smart vehicle camera featuring different output bus interfaces.
Figure 22:
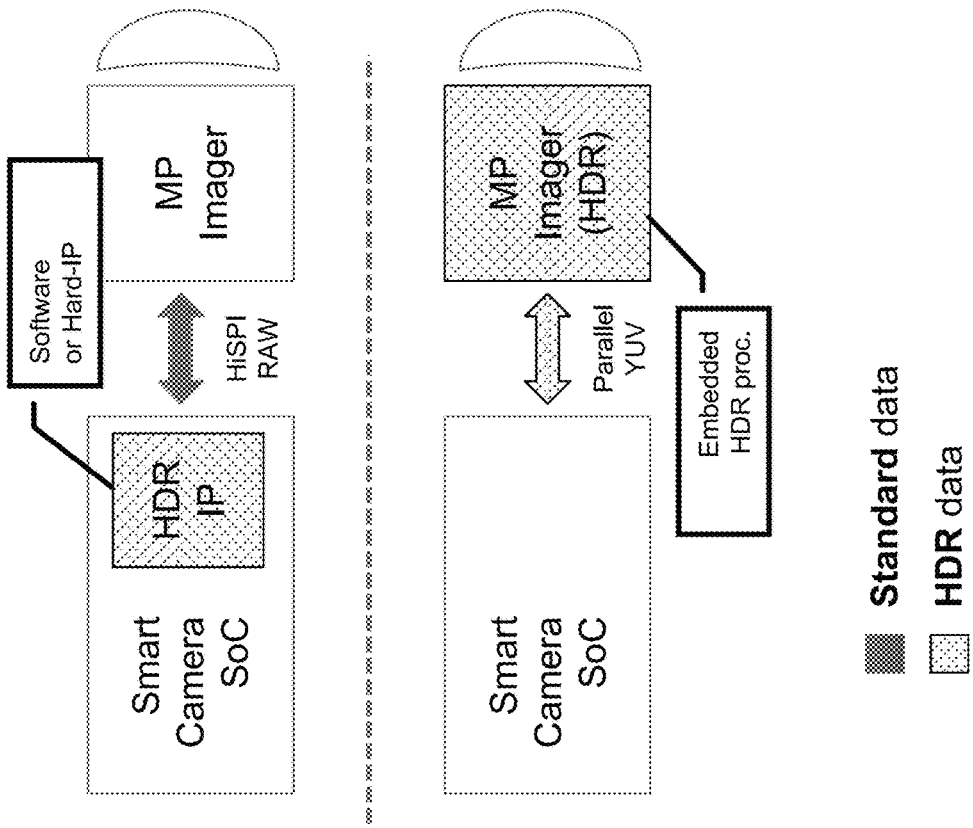
Figure 23:
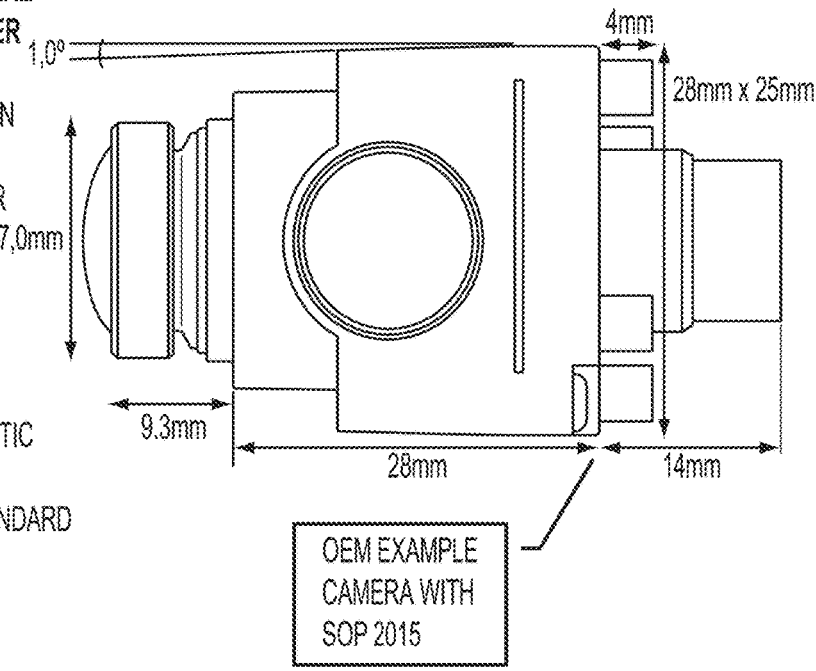
Figure 24:
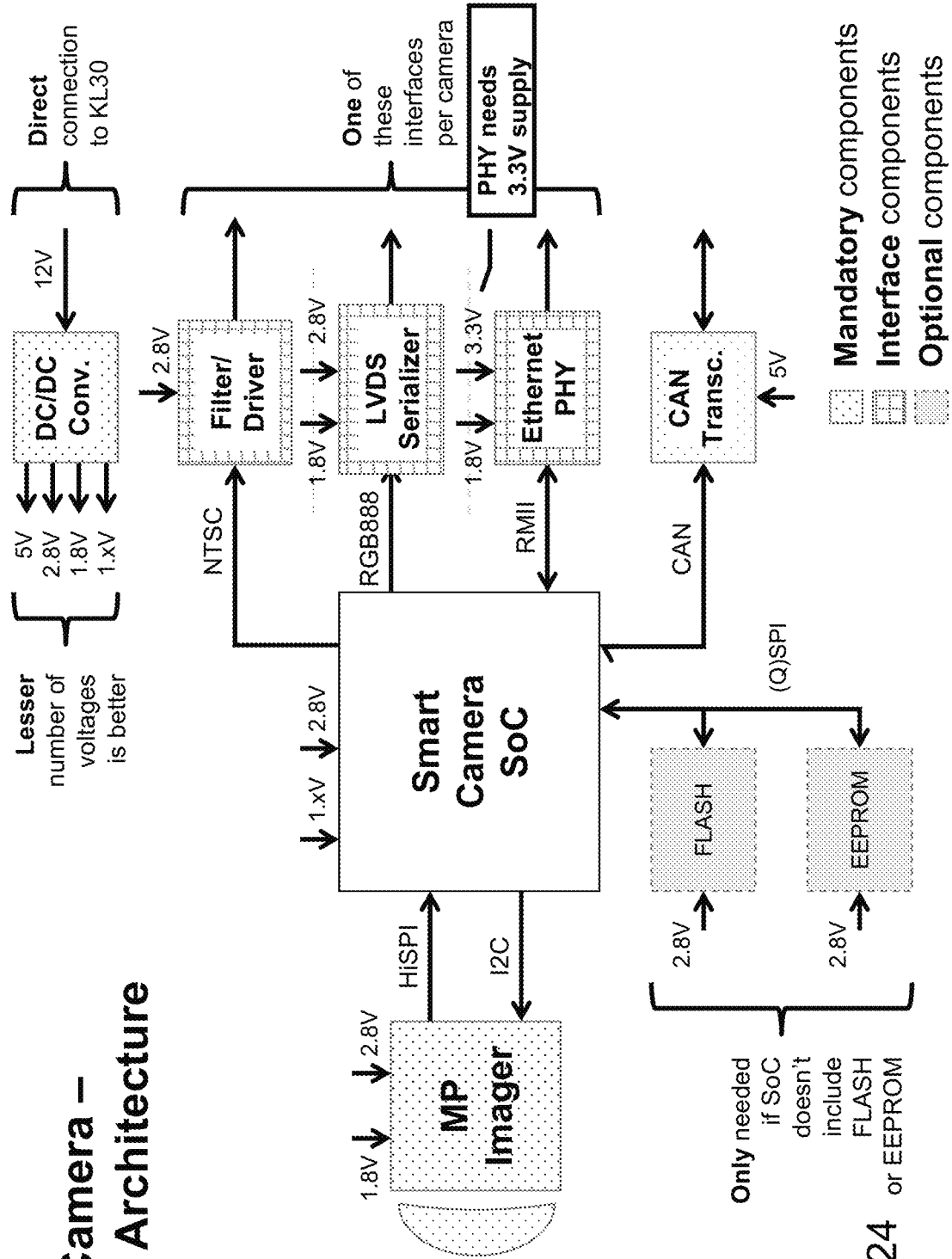
Figure 25:
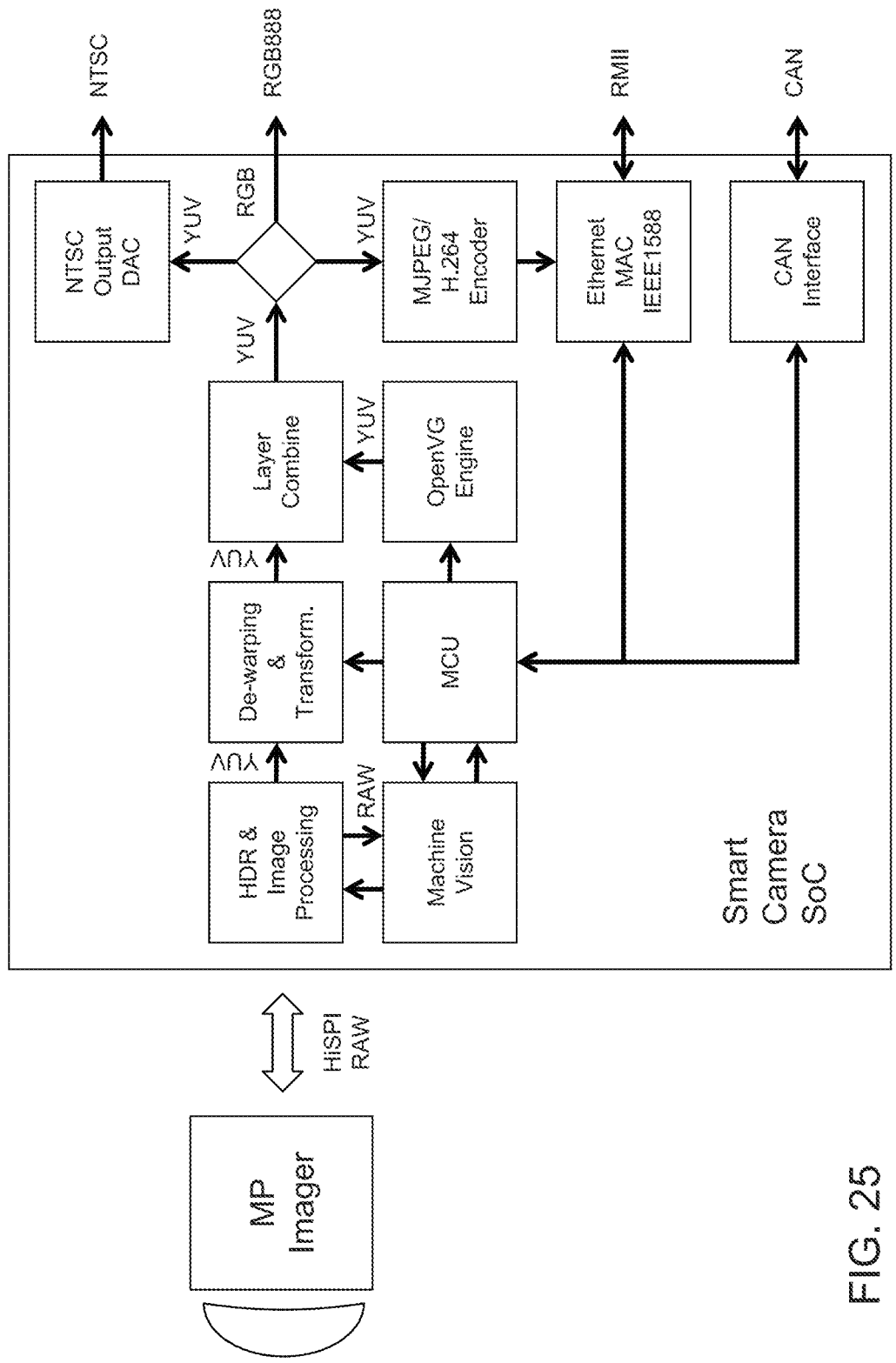
Figure 26:
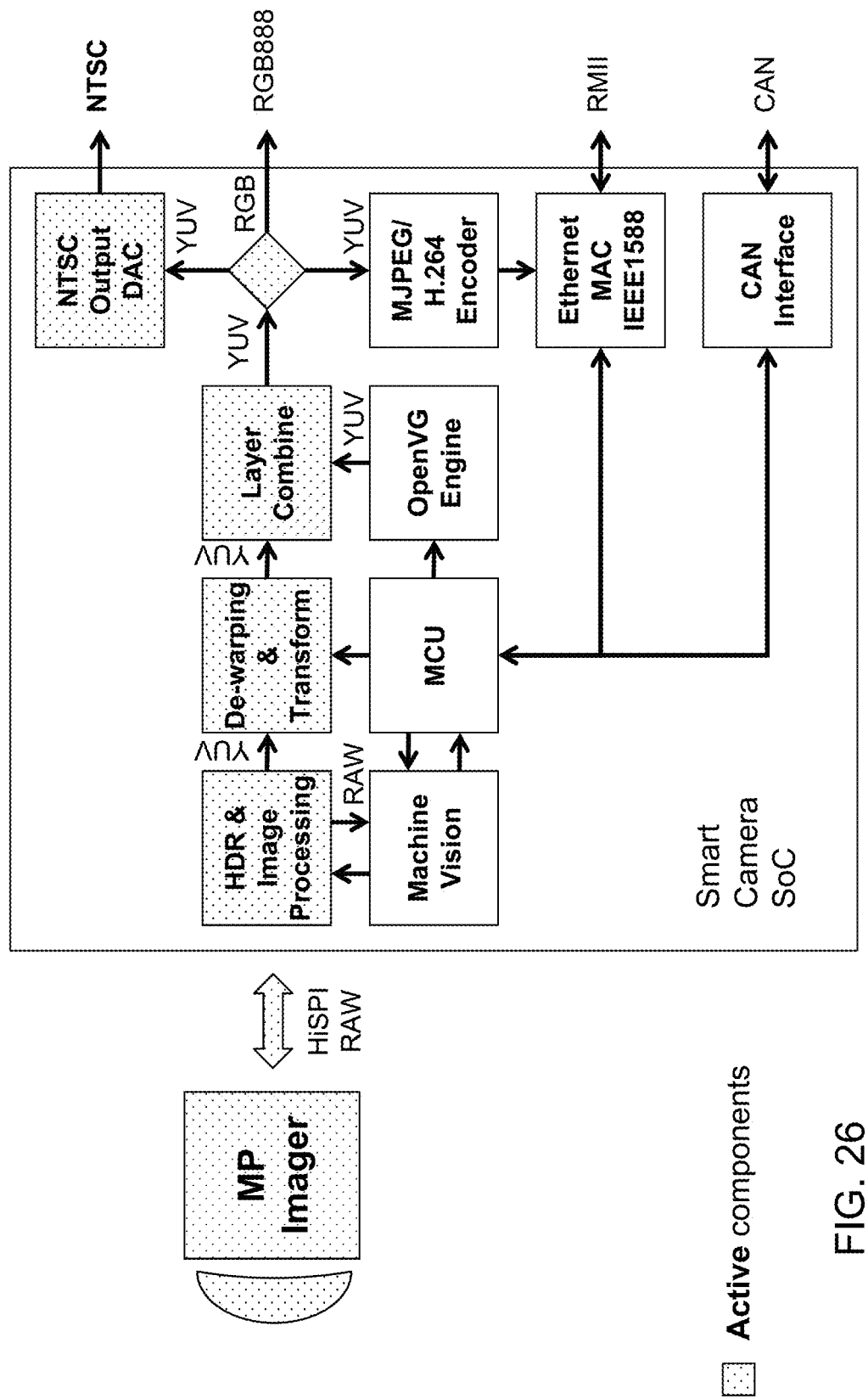
Figure 27:
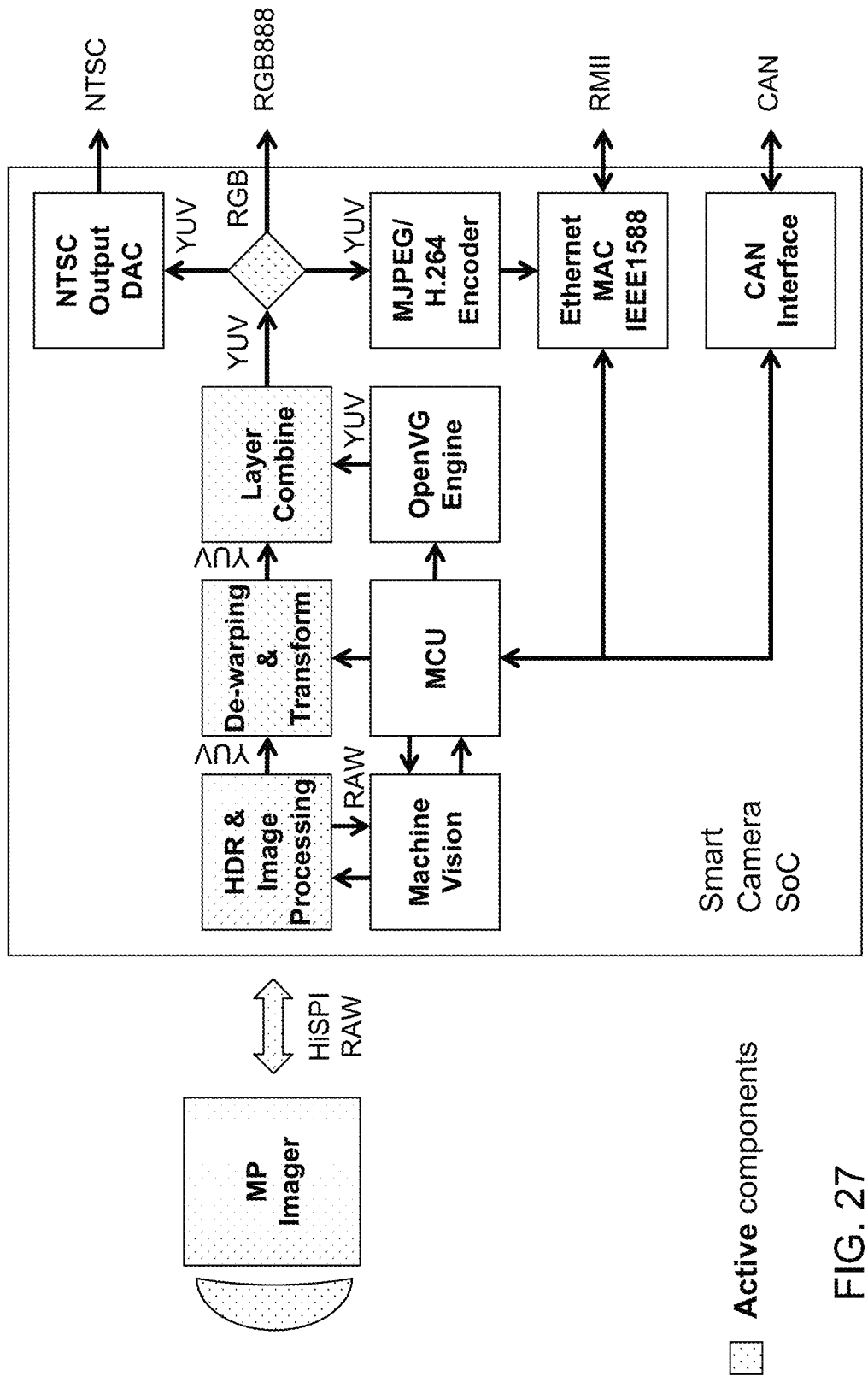
Figure 28:
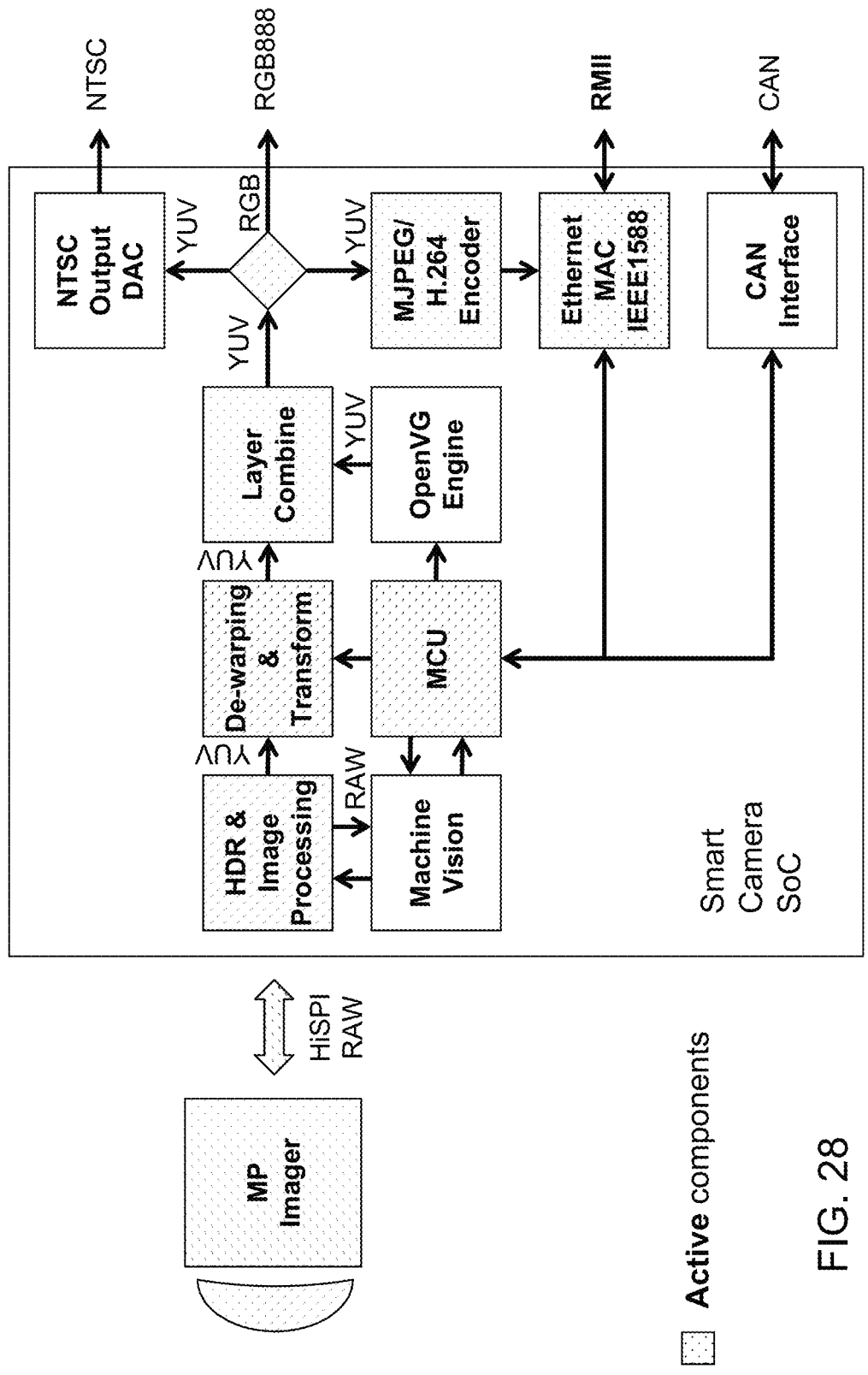
Figure 29:
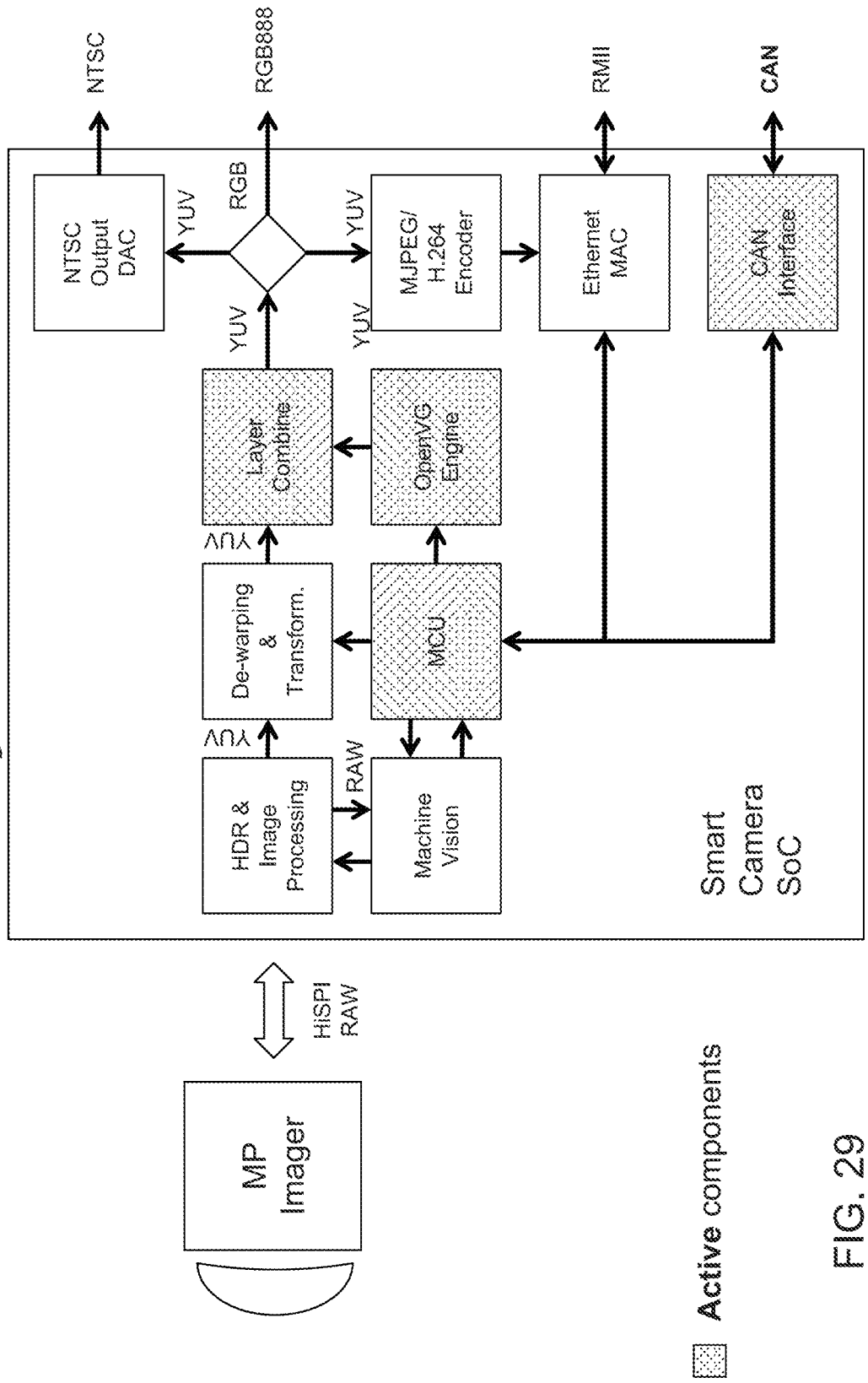
Figure 30:
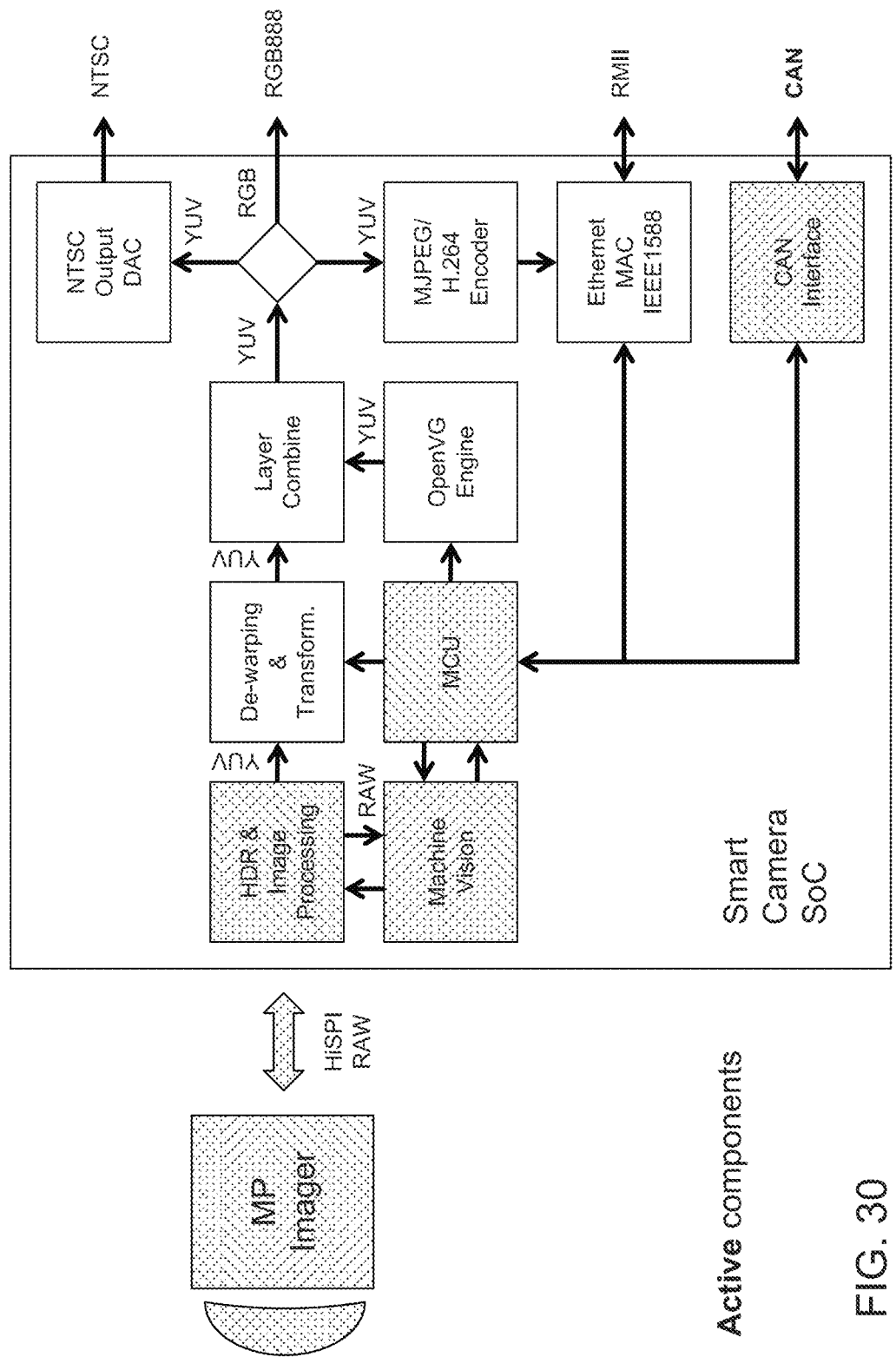
Figure 31:
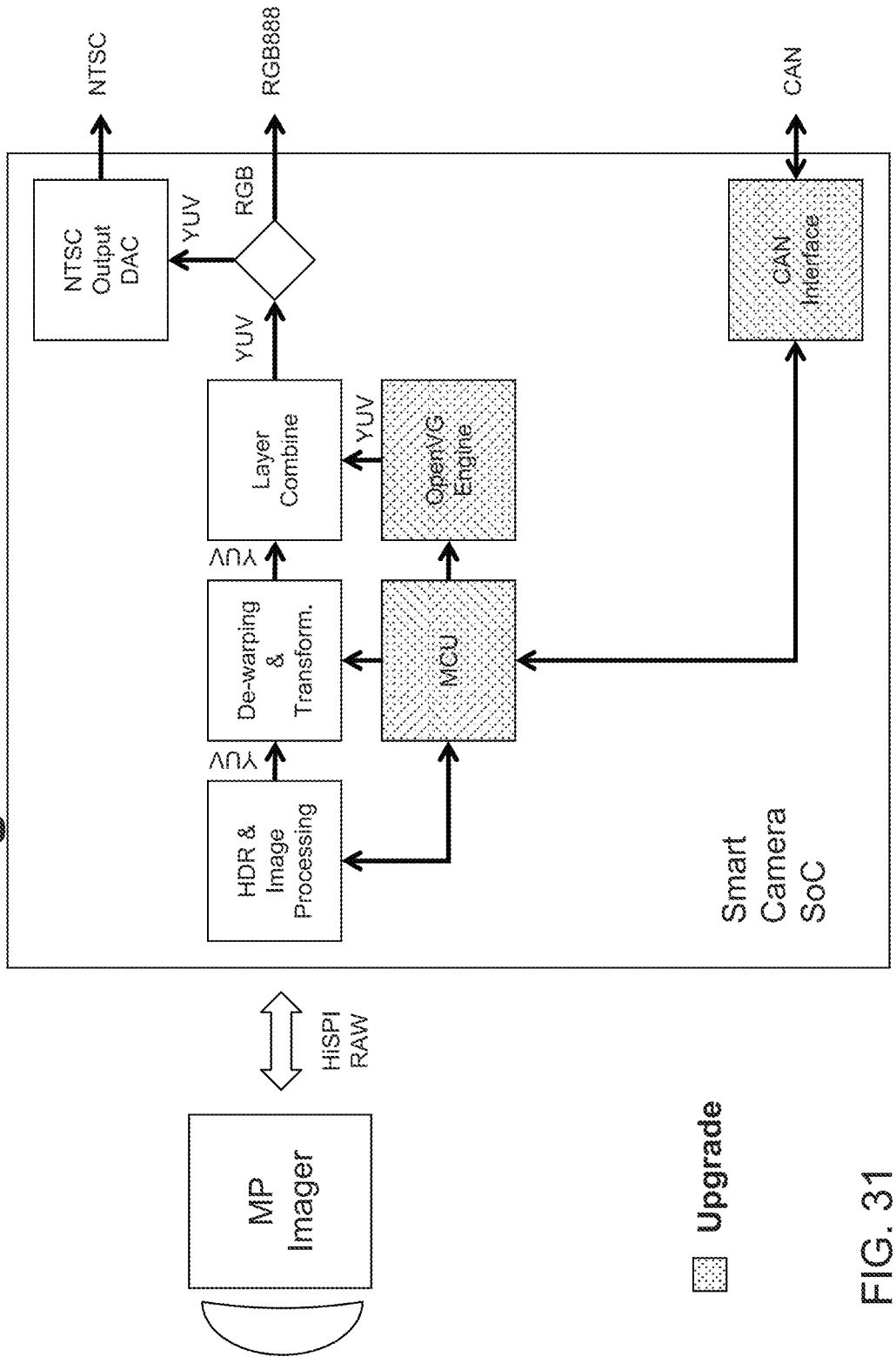
Figure 32:
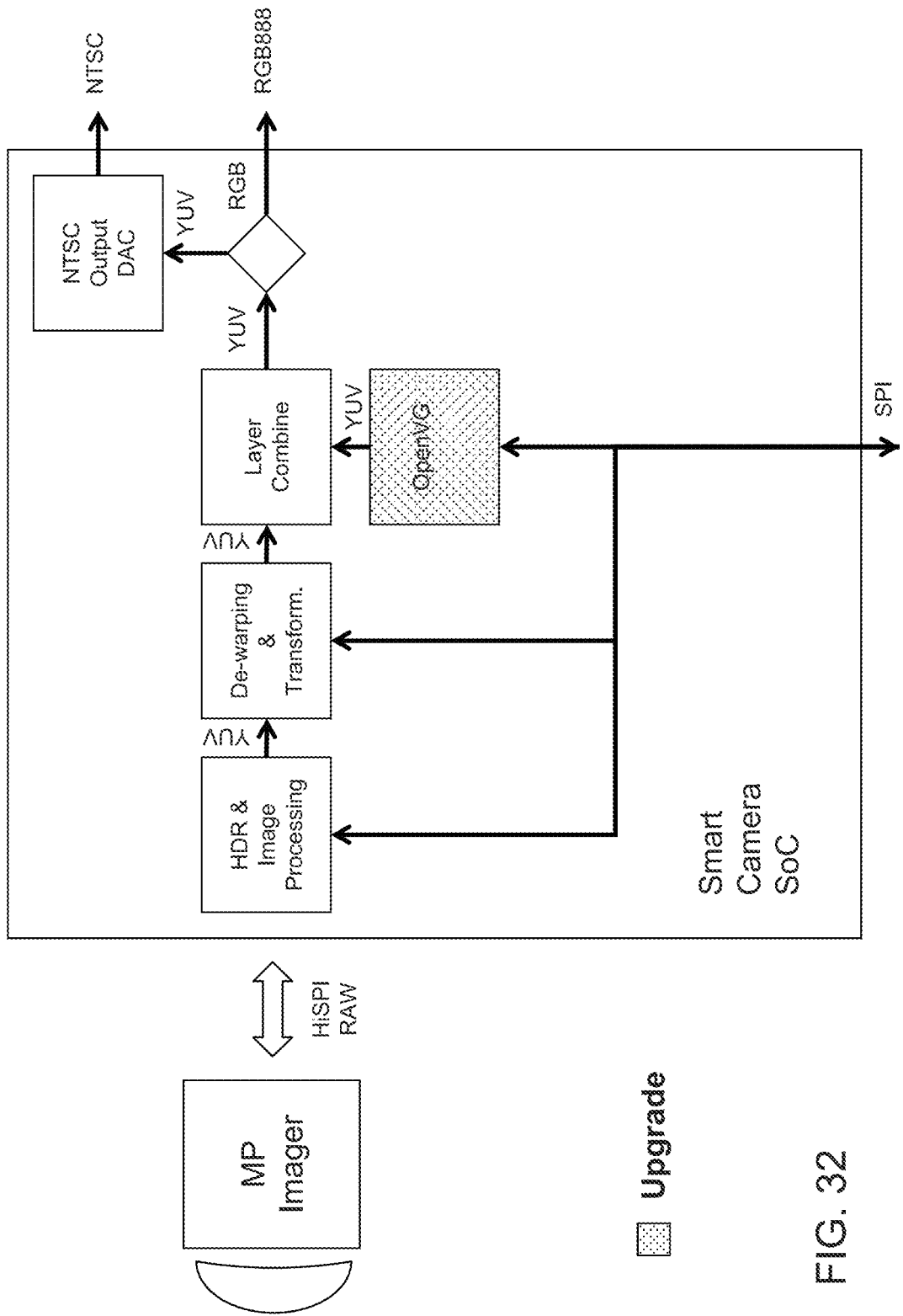
Figure 33:
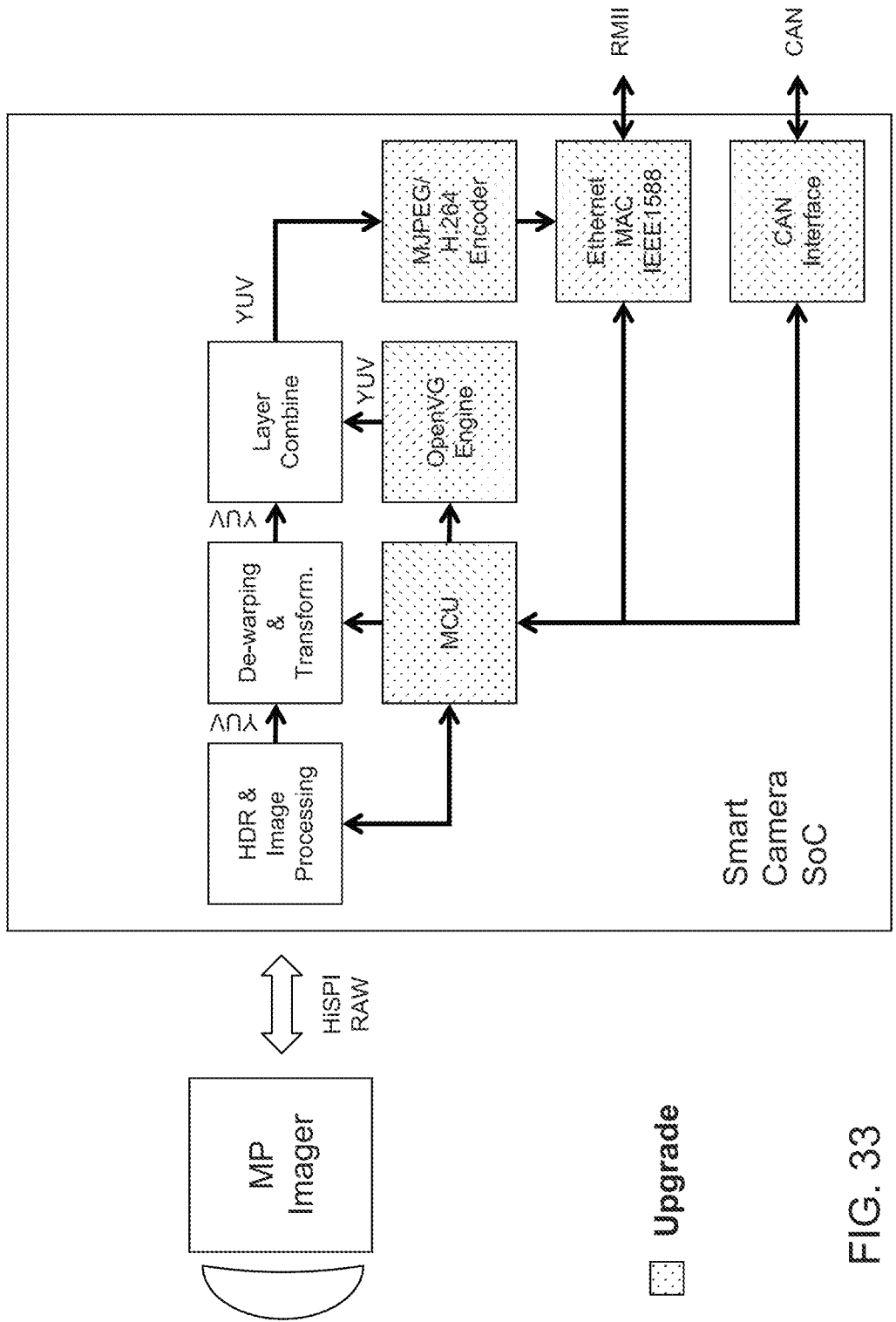
Figure 34:
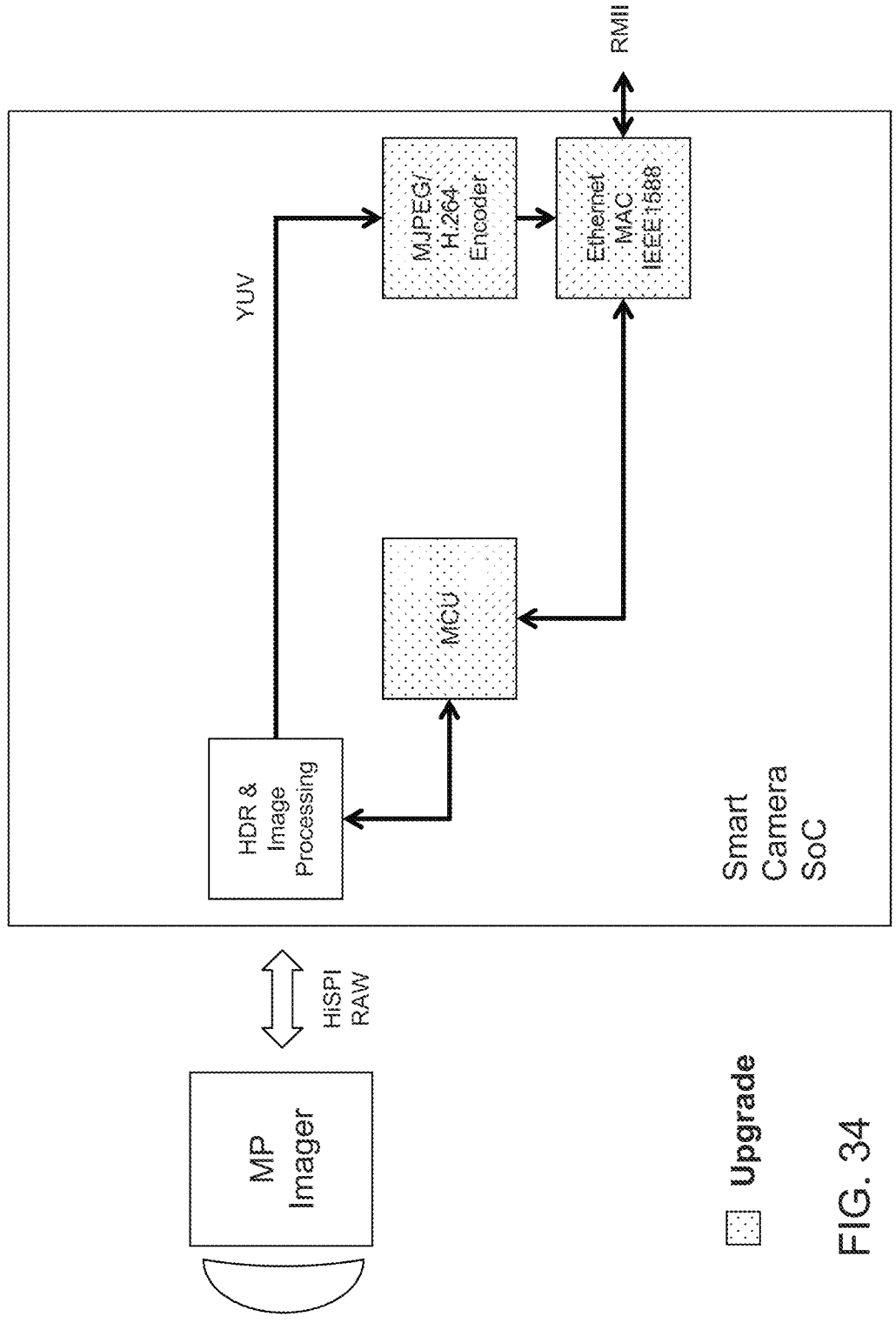
Figure 39:
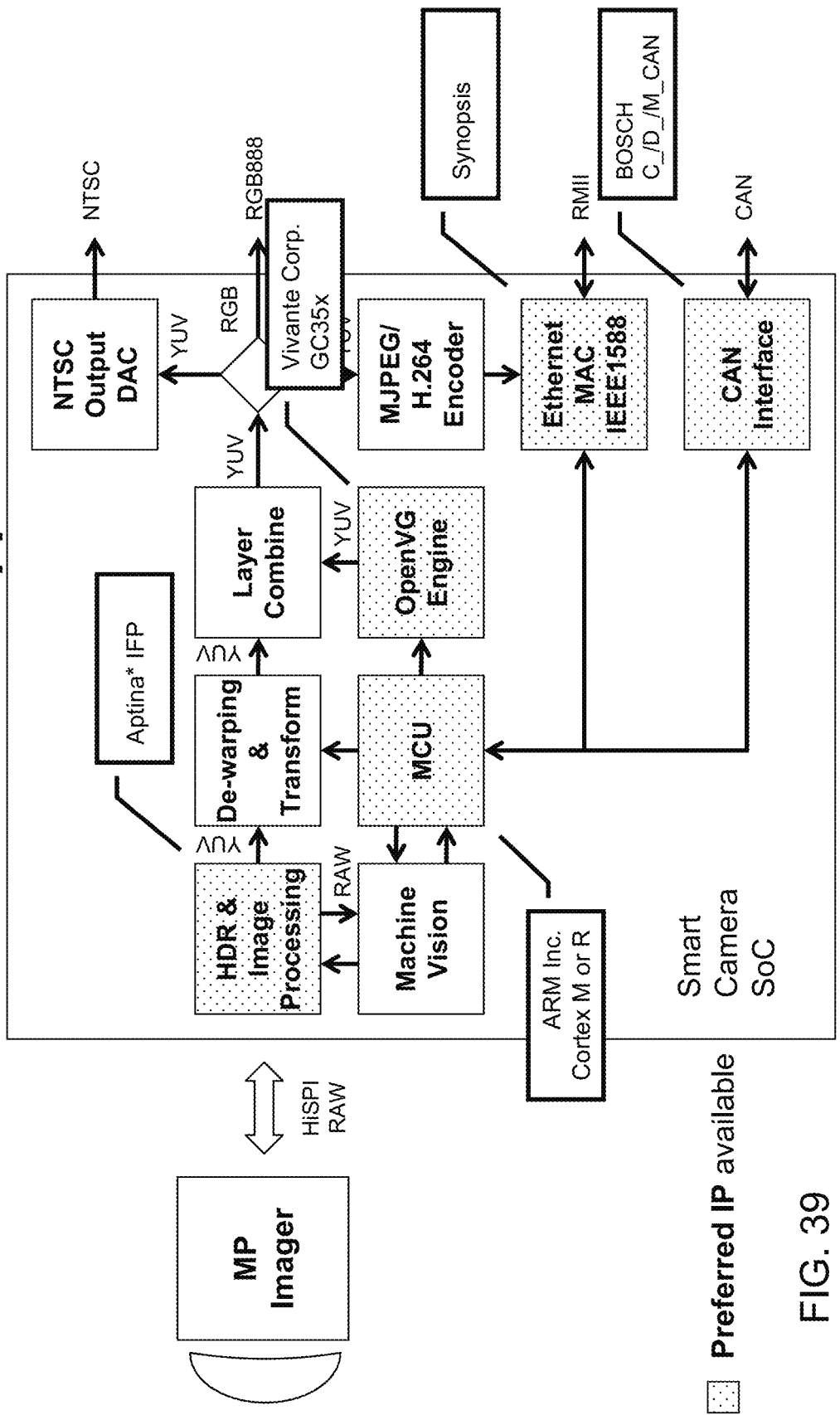
Figure 40:
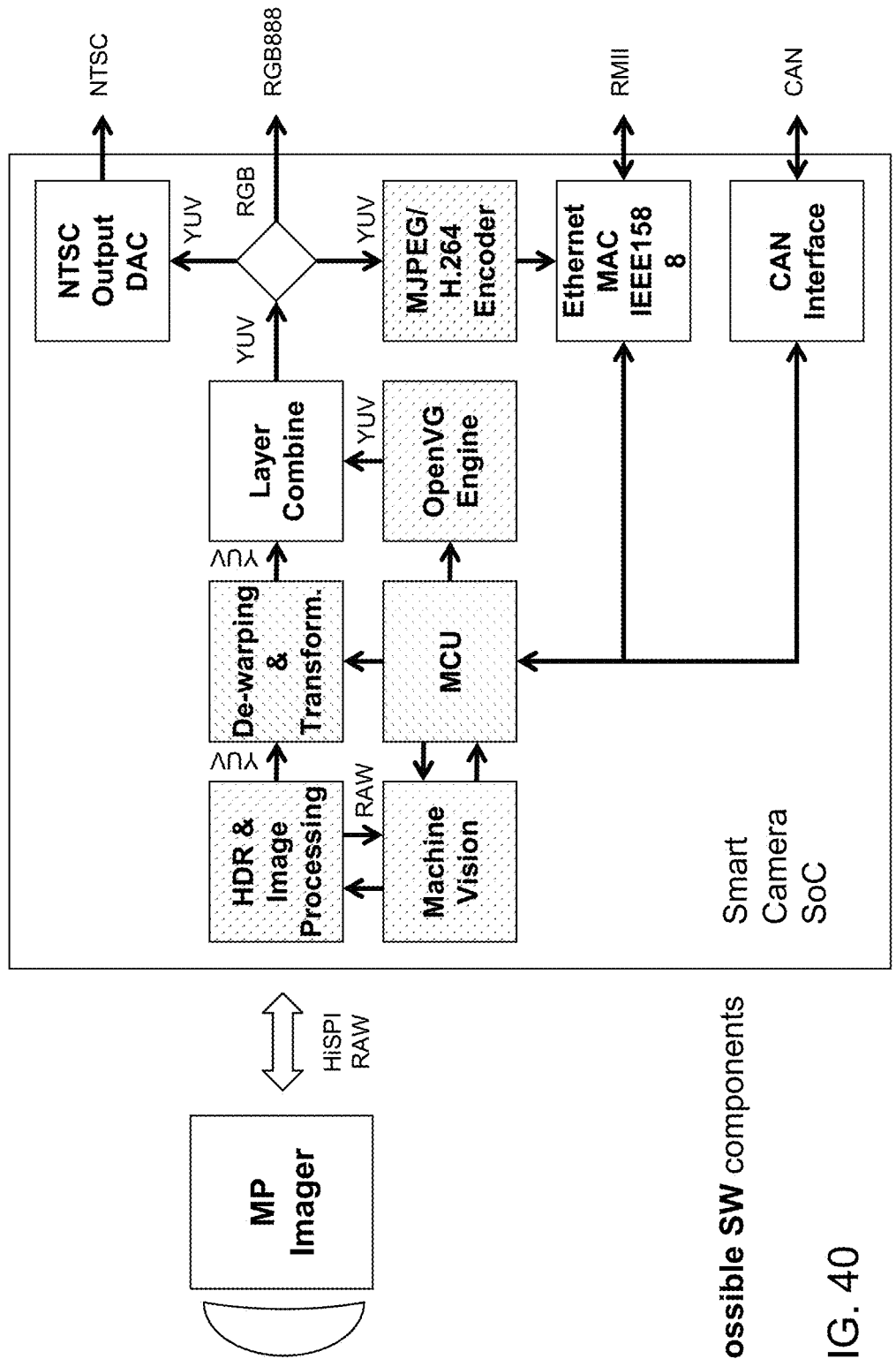

The white image regions are now grown or expanded so that they merge together into one object. This is accomplished using morphology operations (dilate/erode) with a disk as a structure element. See FIG. 15 for images that show the intensity image and the object image.

A search algorithm may be used to find all connected white image regions in the image, where each white image region represents an object. Each object is described by the following parameters:
  Centroid
  Bounding box An object list is then generated. The bounding box of each object is used to search though the 3D POI data in order to find the distance for each object. The objects are grouped depending if they are in the center, left or right side of the FOV. A decision logic taking the object location and distance into account decides which object is reported.

Prediction Filter/Confirmation Filter/Statistical Output Filter/Kalman Filter:

The detection of the closest object using the method above yields a somewhat unstable output. Therefore additional filtering may be required or desired. The output shows two major problems: 1. intermittent detection and 2. unstable or jumpy output.

A prediction filter was implemented to overcome intermittent detections. All parameters describing the closest object are stored in a ring buffer with eight elements. Therefore, up to eight previous detections may be available to be used by the prediction filter. In case the object is not detected in the current frame, the filter will predict the object centroid and distance using the previous positive detections. The ring buffer may contain at least four positive detections out of the previous eight frames. The current (missing) detection is predicted by linear interpolating a function for each of the centroid coordinate (column and row) and the distance. The current centroid and distance is calculated using this interpolated function. The predicted centroid and distance is added into the ring buffer for the current frame.

The prediction filter will predict the object for up to eight consecutive frames using the method described above. If the object was not detected for eight consecutive frames, the object will not be reported anymore.

If an object enters the FOV, the detection of the object may be intermittent. The predication filter does not work properly at this time since the ring buffer is not filled yet. Therefore, a confirmation filter will allow an object only to be reported if the object was detected for K consecutive times. Once the object was detected for K times, the filters work together ensuring a more stable the output.

A statistical filter is used to filter the output against jumps in the reported distance and object location. The statistical filter may use the same ring buffer as the prediction filter. The statistical filter may interpolate a linear function for each of the centroid coordinates (column and row) and the distance in case the ring buffer contains at least six positive detections out of the previous eight frames. The statistical filter will calculate the expected object using the interpolated functions. The actual current object can be now compared with the expected object. Adjustments to the reported object can be made in order to filter out any unstable behavior.

Optionally, a Kalman filter may be implemented in order to reduce the jitter in the output. The Kalman filter is an algorithm which operates recursively on streams of input data (centroid and distance) to produce a statistically optimal output estimate. The predicted output may be calculated by summing the weighted current sample and weighted previous output. The predicted output and current sample may be processed using the respective standard deviations to achieve a statistically optimal output.

The final reported object is filtered with an infinite impulse response low pass filter using the last and current reported object.

Selection of Reported Object:

In case the vehicle is stationary, a moving object may be detected. In case the vehicle was previously moving, a stationary object might have been detected and this object is now tracked. Therefore, a decision logic may be desired or required to decide which object is reported.

Generally, the closer object is reported. In order to prevent the output to jump back and forth between the two objects a hysteresis is required.

A low pass output filter may monitor if a previously stationary object starts moving. In this case, the filter blends the transition of the object state together to no jump in the object location and distance occurs.

Therefore, the present invention provides a system that is operable to detect objects or vehicles at or near the subject vehicle. The system may operate to detect points of interest in the captured images and determine motion vectors of the detected points to determine if the points are at or part of an object of interest in the field of view of the vehicle camera of the visions system of the present invention.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects shown and described in FIGS. 16-40.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012 and published Feb. 7, 2013 as International Publication No. WO 2013/019707, and/or PCT Application No. PCT/US2012/048110, filed Jul. 25, 2012 and published Jan. 31, 2013 as International Publication No. WO 2013/016409, and/or PCT Application No. PCT/CA2012/000378, filed Apr. 25, 2012 and published Nov. 1, 2012 as International Publication No. WO 2012/145822, and/or PCT Application No. PCT/US2012/056014, filed Sep. 19, 2012 and published Mar. 28, 2013 as International Publication No. WO 2013/043661, and/or PCT Application No. PCT/US12/57007, filed Sep. 25, 2012 and published Apr. 4, 2013 as International Publication No. WO 2013/048994, and/or PCT Application No. PCT/US2012/061548, filed Oct. 24, 2012 and published May 2, 2013 as International Publication No. WO 2013/063014, and/or PCT Application No. PCT/US2012/062906, filed Nov. 1, 2012 and published May 10, 2013 as International Publication No. WO 2013/067083, and/or PCT Application No. PCT/US2012/063520, filed Nov. 5, 2012 and published May 16, 2013 as International Publication No. WO 2013/070539, and/or PCT Application No. PCT/US2012/064980, filed Nov. 14, 2012 and published May 23, 2013 as International Publication No. WO 2013/074604, and/or U.S. patent application Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. US-2013-0002873, and/or U.S. provisional applications, Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; and/or Ser. No. 61/565,713, filed Dec. 1, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/650,667, filed May 23, 2012; Ser. No. 61/579,682, filed Dec. 23, 2011; Ser. No. 61/565,713, filed Dec. 1, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012/075250, and/or PCT Application No. PCT/CA2012/000378, filed Apr. 25, 2012 and published Nov. 1, 2012 as International Publication No.

WO 2012/145822, and/or U.S. patent application Ser. No. 13/333,337, filed Dec. 21, 2011, now U.S. Pat. No. 9,264, 672, and/or U.S. provisional applications, Ser. No. 61/615, 410, filed Mar. 26, 2012; Ser. No. 61/588,833, filed Jan. 20, 2012; Ser. No. 61/570,017, filed Dec. 13, 2011; and/or Ser. No. 61/568,791, filed Dec. 9, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system, said vehicular vision system comprising:
   a rearward viewing camera disposed at a vehicle equipped with said vehicular vision system, said rearward viewing camera having an exterior field of view exterior and at least rearward of the equipped vehicle;
   a control, wherein said control comprises a processor that processes image data captured by said camera to detect objects present exterior of the equipped vehicle and in the field of view of said camera;
   wherein, during a reversing maneuver of the equipped vehicle, said control, via processing by said processor of captured image data, detects points of interest of detected objects present in the field of view of said camera;
   wherein the detected points of interest of the detected objects comprise detected corner features of the detected objects that are present in the field of view of said camera;
   wherein said control, via processing by said processor of captured image data and responsive to detection of the points of interest of the detected objects, determines if the detected objects have height dimensions and determines that objects having a height dimension greater than a threshold height comprise objects of interest;
   wherein, during the reversing maneuver of the equipped vehicle, and via processing by said processor of captured image data, said control determines distances to the determined objects of interest and determines which object of interest is closest to the equipped vehicle; and
   wherein, during the reversing maneuver of the equipped vehicle, and responsive to the determination of the closest object of interest rearward of the equipped vehicle, said control determines whether the determined closest object of interest is a potential hazard.

2. The vehicular vision system of claim 1, wherein, responsive to determination that the determined closest object of interest is a potential hazard, said control generates an alert to a driver of the equipped vehicle.

3. The vehicular vision system of claim 1, wherein the threshold height is greater than a height of a curb.

4. The vehicular vision system of claim 1, wherein the detected corner features of the detected objects are disposed at respective heights above ground.

5. The vehicular vision system of claim 1, wherein said control processes captured image data to determine movement vectors of the detected points of interest of the detected objects, and wherein, responsive to said processing of captured image data, said control determines whether determined movement vectors of detected points of interest of a detected object present in the field of view of said camera are indicative of the object being in a position where it may collide with the equipped vehicle.

6. The vehicular vision system of claim 5, wherein determined movement vectors that are less than a threshold pixel length are not considered indicative of an object of interest.

7. The vehicular vision system of claim 5, wherein said control determines that detected points of interest are part of an object of interest when at least one movement vector is greater than a threshold amount.

8. The vehicular vision system of claim 1, wherein said control determines objects of interest by utilizing a first and a second detection method in combination, and wherein said first method for determining objects of interest comprises at least one of Gaussian blurring and consecutive Hessian blob detection, and wherein said second method for determining objects of interest comprises a FAST9 corner detector.

9. The vehicular vision system of claim 1, wherein said control operates in one of a plurality of stages, and wherein said plurality of stages has at least four different stages comprising (i) vehicle stationary and object stationary, (ii) vehicle stationary and object moving, (iii) vehicle moving and object stationary and (iv) vehicle moving and object moving.

10. The vehicular vision system of claim 1, wherein said camera comprises part of a camera module, and wherein said camera module includes said control.

11. A vehicular vision system, said vehicular vision system comprising:
  a rearward viewing camera disposed at a vehicle equipped with said vehicular vision system, said rearward viewing camera having an exterior field of view exterior and at least rearward of the equipped vehicle;
  a control, wherein said control comprises a processor that processes image data captured by said camera to detect objects present exterior of the equipped vehicle and in the field of view of said camera;
  wherein, during a reversing maneuver of the equipped vehicle, said control, via processing by said processor of captured image data, detects points of interest of detected objects present in the field of view of said camera;
  wherein the detected points of interest of the detected objects comprise detected corner features of the detected objects that are present in the field of view of said camera, and wherein the detected corner features of the detected objects are disposed at respective heights above ground;
  wherein said control, via processing by said processor of captured image data and responsive to detection of the points of interest of the detected objects, determines if the detected objects have height dimensions and determines that objects having a height dimension greater than a threshold height comprise objects of interest;
  wherein, during the reversing maneuver of the equipped vehicle, and via processing by said processor of captured image data, said control determines distances to the determined objects of interest and determines which object of interest is closest to the equipped vehicle;
  wherein, during the reversing maneuver of the equipped vehicle, and responsive to the determination of the closest object of interest rearward of the equipped vehicle, said control determines whether the determined closest object of interest is a potential hazard; and
  wherein, responsive to determination that the determined closest object of interest is a potential hazard, said control generates an alert to a driver of the equipped vehicle.

12. The vehicular vision system of claim 11, wherein the threshold height is greater than a height of a curb.

13. The vehicular vision system of claim 11, wherein said control processes captured image data to determine movement vectors of the detected points of interest of the detected objects, and wherein, responsive to said processing of captured image data, said control determines whether determined movement vectors of detected points of interest of a detected object present in the field of view of said camera are indicative of the object being in a position where it may collide with the equipped vehicle.

14. The vehicular vision system of claim 13, wherein determined movement vectors that are less than a threshold pixel length are not considered indicative of an object of interest.

15. The vehicular vision system of claim 13, wherein said control determines that detected points of interest are part of an object of interest when at least one movement vector is greater than a threshold amount.

16. A vehicular vision system, said vehicular vision system comprising:
  a rearward viewing camera disposed at a vehicle equipped with said vehicular vision system, said rearward viewing camera having an exterior field of view exterior and at least rearward of the equipped vehicle;
  a control, wherein said control comprises a processor that processes image data captured by said camera to detect objects present exterior of the equipped vehicle and in the field of view of said camera;
  wherein, during a reversing maneuver of the equipped vehicle, said control, via processing by said processor of captured image data, detects points of interest of detected objects present in the field of view of said camera;
  wherein the detected points of interest of the detected objects comprise detected corner features of the detected objects that are present in the field of view of said camera;
  wherein said control, via processing by said processor of captured image data and responsive to detection of the points of interest of the detected objects, determines if the detected objects have height dimensions and determines that objects having a height dimension greater than a threshold height comprise objects of interest;
  wherein the threshold height is greater than a height of a curb;
  wherein, during the reversing maneuver of the equipped vehicle, and via processing by said processor of captured image data, said control determines distances to the determined objects of interest and determines which object of interest is closest to the equipped vehicle;
  wherein, during the reversing maneuver of the equipped vehicle, and responsive to the determination of the determined closest object of interest rearward of the equipped vehicle, said control determines whether the determined closest object of interest is a potential hazard; and
  wherein, responsive to determination that the determined closest object of interest is a potential hazard, said control generates an alert to a driver of the equipped vehicle.

17. The vehicular vision system of claim 16, wherein said camera comprises part of a camera module, and wherein said camera module includes said control.

18. The vehicular vision system of claim 16, wherein the detected corner features of the detected objects are disposed at respective heights above ground.

19. The vehicular vision system of claim 16, wherein said control processes captured image data to determine movement vectors of the detected points of interest of the detected objects, and wherein, responsive to said processing of captured image data, said control determines whether determined movement vectors of detected points of interest of a detected object present in the field of view of said camera are indicative of the object being in a position where it may collide with the equipped vehicle.

20. The vehicular vision system of claim 19, wherein said control determines that detected points of interest are part of an object of interest when at least one movement vector is greater than a threshold amount.

* * * * *